(12) United States Patent
Kobayashi

(10) Patent No.: US 6,250,378 B1
(45) Date of Patent: Jun. 26, 2001

(54) INFORMATION PROCESSING APPARATUS AND ITS HEAT SPREADING METHOD

(75) Inventor: Takashi Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/522,012

(22) Filed: Mar. 9, 2000

Related U.S. Application Data

(62) Division of application No. 09/205,090, filed on Dec. 3, 1998.

(30) Foreign Application Priority Data

| May 29, 1998 | (JP) | 10-148586 |
|---|---|---|
| May 29, 1998 | (JP) | 10-148587 |
| May 29, 1998 | (JP) | 10-148588 |

(51) Int. Cl.[7] ............... F28D 15/00; F28F 7/00; H05K 5/00
(52) U.S. Cl. ............... 165/104.33; 165/80.3; 361/687; 361/700
(58) Field of Search ............... 165/104.33, 80.3; 361/687, 700; 257/715

(56) References Cited

U.S. PATENT DOCUMENTS

| 4,685,512 | 8/1987 | Edelstein et al. . | |
| --- | --- | --- | --- |
| 5,588,483 | 12/1996 | Ishida . | |
| 5,606,341 | 2/1997 | Aguilera . | |
| 5,634,351 | * 6/1997 | Larson et al. | 165/104.33 |
| 5,646,822 | * 7/1997 | Bhatia et al. | 361/700 |
| 5,647,429 | * 7/1997 | Oktay et al. | 165/104.33 |
| 5,796,581 | 8/1998 | Mok . | |
| 5,832,987 | 11/1998 | Lowry et al. . | |
| 5,847,925 | 12/1998 | Progl et al. . | |
| 5,880,929 | 3/1999 | Bhatia | 361/687 |
| 5,910,883 | 6/1999 | Cipolla et al. | 165/104.33 |
| 5,937,936 | 8/1999 | Furukawa et al. . | |

FOREIGN PATENT DOCUMENTS

| 0 702 287 | 3/1996 | (EP) . |
|---|---|---|
| 5-297981 | 11/1993 | (JP) . |
| 6-266474 | 9/1994 | (JP) . |
| 6-295212 | 10/1994 | (JP) . |
| 7-198278 | 8/1995 | (JP) . |
| 8-035786 | 2/1996 | (JP) . |
| 8-042983 | 2/1996 | (JP) . |
| 8-087354 | 4/1996 | (JP) . |
| 8-204373 | 8/1996 | (JP) . |
| 8-261672 | 11/1996 | (JP) . |
| 9-006481 | 1/1997 | (JP) . |
| 9-114403 | 5/1997 | (JP) . |
| 9-324991 | 12/1997 | (JP) . |
| WO 96/28005 | 9/1996 | (WO) . |

\* cited by examiner

*Primary Examiner*—Ira S. Lazarus
*Assistant Examiner*—Tho Duong
(74) *Attorney, Agent, or Firm*—Burns, Doane, Swecker & Mathis, LLP

(57) ABSTRACT

The conventional mobile information processing apparatus has a difficulty in conducting heat, which is sent from a heat pipe, throughout a plane of a heat spreading board, due to an inadequate heat conduction to a direction of the plane of the heat spreading board. The present invention implements a heat spreading configuration used in an information processing apparatus having a liquid crystal display panel by effectively using a whole area of the heat spreading board by assembling a thermo-siphon to the heat spreading board and then conducting the heat from CPU, which is a heat generation unit, from the heat pipe to the thermo-siphon.

8 Claims, 47 Drawing Sheets

Fig.9

| CONVERTED VALUES TO ROOM TEMPERATURE 35 °C<br>TOTAL ELECTRICITY CONSUMPTION 15W(CPU10W+M/B5W) | | |
|---|---|---|
| MAIN COMPONENTS \ CONFIGURATION CONDITIONS | CONFIGURATION 1 | CONFIGURATION 2 |
| CPU CASE<br><100 °C> | 124.6 °C | 92.3 °C |
| CHASSIS K/B | 57.3 °C<br>(ABOVE CPU) | 48.5 °C<br>(ABOVE CPU) |
| BOTTOM CHASSIS | 68.1 °C<br>(BELOW CPU) | 52.6 °C<br>(BELOW CPU) |
| TEMPERATURE DIFFERENCE OF LATERAL CHASSIS OF LID<br><WITHIN RANGE OF 5 TO 10k> | — | 6.5K |
| RESULTS | ACCUMULATION OF HEAT AT CPU IS PROMINENT. CPU, K/B, BOTTOM ARE NOT GOOD. AT TOTAL OF 15W (CPU10W+M/B5W), HEAT DISSIPATION AND COOLING OF MAIN BODY WILL BE DIFFICULT. (CPU OF ABOUT 5W IS THE LIMIT) | DUE TO TWO PHASE HEAT FLOW TRANSFER EFFECT IN THERMO-SIPHON, ABLE TO IMPLEMENT HIGHER TEMPERATURE CPU BY EFFECTIVELY USING WHOLE SURFACE OF DISPLAY PANEL, WHICH ENABLES TO CLEAR ALL TEMPERATURE.<br><br>NATURAL COOLING OF 10W CPU IS POSSIBLE. |

Fig.10

| TOTAL HEAT RESISTANCE $R_T$(K/W) | HEAT RESISTANCE AT LID $R_D$ (K/W) $R_D$=r1+r2+r3+r4 | r1: HEAT RESISTANCE BETWEEN THERMALLY CONDUCTIVE BLOCK 2 AND HINGE 13 |
|---|---|---|
| | | r2: HEAT RESISTANCE BETWEEN HINGE 13 AND HEAT PIPE 3 |
| | | r3: HEAT RESISTANCE BETWEEN HEAT PIPE 3 AND FASTENING BOARD 4 |
| | | r4: HEAT RESISTANCE BETWEEN FASTENING BOARD 4 AND AMBIENT |
| | HEAT RESISTANCE AT MAIN BODY $R_M$(K/W) | HEAT SPREADING OF MAIN BODY CHASSIS |

INFORMATION PROCESSING APPARATUS AND ITS HEAT SPREADING METHOD

This application is a divisional of application Ser. No. 09/205,090, filed Dec. 3, 1998.

BACKGROUND OF THE INVENTION

1. Field of the Invention

The present invention relates to the information processing apparatus and its heat spreading method, particularly relating to a mobile information processing apparatus that can readily release a heat generated to outside.

2. Background Arts

Conventionally, a technique relating to this field is disclosed in Japanese unexamined patent publication HEI 9-6481. The conventional mobile information processing apparatus mentioned in this publication as illustrated in FIG. 47 comprises a lid 51 incorporating a heat pipe 3 and a heat spreading board 5, and a main body 50 incorporating a heat generation unit 1. The heat generated from the heat generation unit 1 is released from the heat spreading board 5 via a thermally conductive block 2.

Another conventional techniques relating to this field are Japanese unexamined patent publications HEI 8-87354, HEI 8-204373 and HEI 8-261672.

FIG. 48 illustrates a side view of disintegrated lid 51. Following components are installed in between a front panel 60 and an external chassis 12: a liquid crystal display panel 7; a back light 10; a back light optical system 62; and a inverter circuit board 95 for the back light.

FIG. 49 illustrates a temperature profile of the lid 51 and the main body 50. Curved lines in the temperature profile illustrate isotherms. As can be seen from FIG. 49, a lot of heat is being generated from the CPU 1, the back light 10 and the inverter circuit board 95.

The conventional mobile information processing apparatus has difficulty in conducting heat, which is sent from the heat pipe 3, throughout the heat spreading board due to an inadequate heat conduction to a direction of plane of the heat spreading board 5. As a result of this, from within various positions of the heat spreading board 5, only positions that are close to the heat pipe 3 were able to contribute in spreading the heat such that an effect of heat spreading in the conventional mobile information processing apparatus is therefore inadequate.

Also, the conventional mobile information processing apparatus has problems of noise and loss of energy, which are caused by a leakage current from the back light inverter circuit board 95 incorporated at an inner side of the lid 51, flowing into the metallic chassis 12, as shown in FIG. 21.

SUMMARY OF THE INVENTION

The present invention aims to solve these problems by improving an efficiency of the heat spreading of the information processing apparatus. Also, the invention aims to control an influence of the leakage current that has on the information processing apparatus.

According to one aspect of the present invention, an information processing apparatus comprises a main body including a heat generation unit; a lid for covering the main body; and a thermo-siphon installed in the lid, for releasing a heat generated by the heat generation unit.

According to another aspect of the present invention, the information processing apparatus further comprises a heat spreading board attached to the thermo-siphon.

According to another aspect of the present invention, the lid of the information processing apparatus includes a chassis for covering the lid. The heat spreading board is at least a part of the chassis of the lid.

According to another aspect of the present invention, the information processing apparatus includes a heat conductor for conducting the heat generated at the heat generation unit from the heat generation unit to the thermo-siphon.

According to another aspect of the present invention, the heat conductor of the information processing apparatus includes a heat pipe which is placed in between the heat generation unit and the thermo-siphon, for transferring the heat generated at the heat generation unit to the thermo-siphon.

According to another aspect of the present invention, the thermo-siphon of the information processing apparatus includes a liquid reservoir for collecting the working fluid and a flow channel for circulating a working fluid in a. direction of a plane of the heat spreading board. The heat pipe is attached to the liquid reservoir of the thermo-siphon.

According to another aspect of the present invention, the heat conductor of the information processing apparatus includes a thermally conductive block having a hinge in between the heat generation unit and the heat pipe. The heat pipe is inserted in the hinge of the thermally conductive block.

According to another aspect of the present invention, the main body and the lid of the information processing apparatus include a connecting axis, and the thermo-siphon includes a first flow channel for circulating around a periphery of the heat spreading board, and a second flow channel for extending along to a direction perpendicular to the connecting axis of the main body and the lid, which joins with the first flow channel at both ends of the second flow channel.

According to another aspect of the present invention, the main body and the lid of the information processing apparatus include a connecting axis, and the thermo-siphon includes a third flow channel for extending along an edge of the heat spreading board in close proximity to the connecting axis of the main body and the lid, and a fourth flow channel for extending in a direction perpendicular to the connecting axis from the third flow channel.

According to another aspect of the present invention, the thermo-siphon of the information processing apparatus includes a liquid reservoir for collecting a working liquid and a flow channel for circulating a working fluid in a plane direction of the heat spreading board. One end of the heat pipe is inserted to the liquid reservoir of the thermo-siphon.

According to another aspect of the present invention, the main body and the lid of the information processing apparatus include a connecting axis, and one end of the heat pipe is extending along a direction of the connecting axis of the main body and the lid.

According to another aspect of the present invention, the information processing apparatus comprises a circulation pipe for introducing the working fluid accommodated in the thermo-siphon, and for heating the working fluid by the heat generated from the heat generating unit.

According to another aspect of the present invention, the information processing apparatus includes one end of the circulation pipe which is joined to the thermo-siphon and an other end is joined to the heat generating unit.

According to another aspect of the present invention, the circulation pipe of the information processing apparatus includes a partition wall which divides into a vapor channel for sending the working fluid vaporized by the heat from the heat generating unit to the thermo-siphon and a liquid flow back channel for returning the working fluid liquefied at the thermo-siphon.

According to another aspect of the present invention, the circulation pipe of the information processing apparatus includes an inner pipe for sending the working fluid vaporized by the heat from the heat generating unit to the thermo-siphon, and an outer pipe for returning the working fluid liquefied at the thermo-siphon.

According to another aspect of the present invention, the circulation pipe of the information processing apparatus installs a plurality of grooves at an inner wall of the circulation pipe.

According to another aspect of the present invention, the circulation pipe of the information processing apparatus installs a wick at an inner wall of the circulation pipe.

According to another aspect of the present invention, the main body and the lid of the information processing apparatus include a connecting axis, and the circulation pipe is coiled along the connecting axis of the main body and the lid.

According to another aspect of the present invention, the one end and the other end of the circulation pipe of the information processing apparatus is joined to the thermo-siphon, passing the heat generating unit in the middle for introducing the working fluid of the thermo-siphon from the one end and circulate the working fluid to the other end.

According to another aspect of the present invention, the main body and the lid of the information processing apparatus include a connecting axis, and the thermo-siphon includes a vapor channel which extends in a direction farthest from the connecting axis of the main body and the lid, and which joins to the other end of the circulation pipe and, and a plurality of liquid flow back channels which extends in a direction close to the connecting axis, which branches from the vapor channel, and which joins to the one end of the circulation pipe.

According to another aspect of the present invention, an information processing apparatus comprises a main body; a lid including the heat generating unit; and a thermo-siphon installed in the lid, for releasing a heat generated by the heat generation unit.

According to another aspect of the present invention, a heat spreading method for an information processing apparatus comprising the main body including the heat generation unit, the lid for covering the main body, and the thermo-siphon installed in the lid, the heat spreading method comprising steps of: moving a heat generated at the heat generation unit of the main body to the thermo-siphon of the lid; heating a working liquid of the thermo-siphon by a moved heat; transferring a heat of vaporization together with a vapor flow by vaporizing the working fluid; and circulating the working fluid after liquefying a vaporized working fluid by heat spreading.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 9 is a table showing temperature at various positions of the information processing apparatus;

FIG. 10 is a table showing thermal resistance at various positions of the information processing apparatus;

DETAILED DESCRIPTION OF THE PREFERRED EMBODIMENTS

Figure 1:
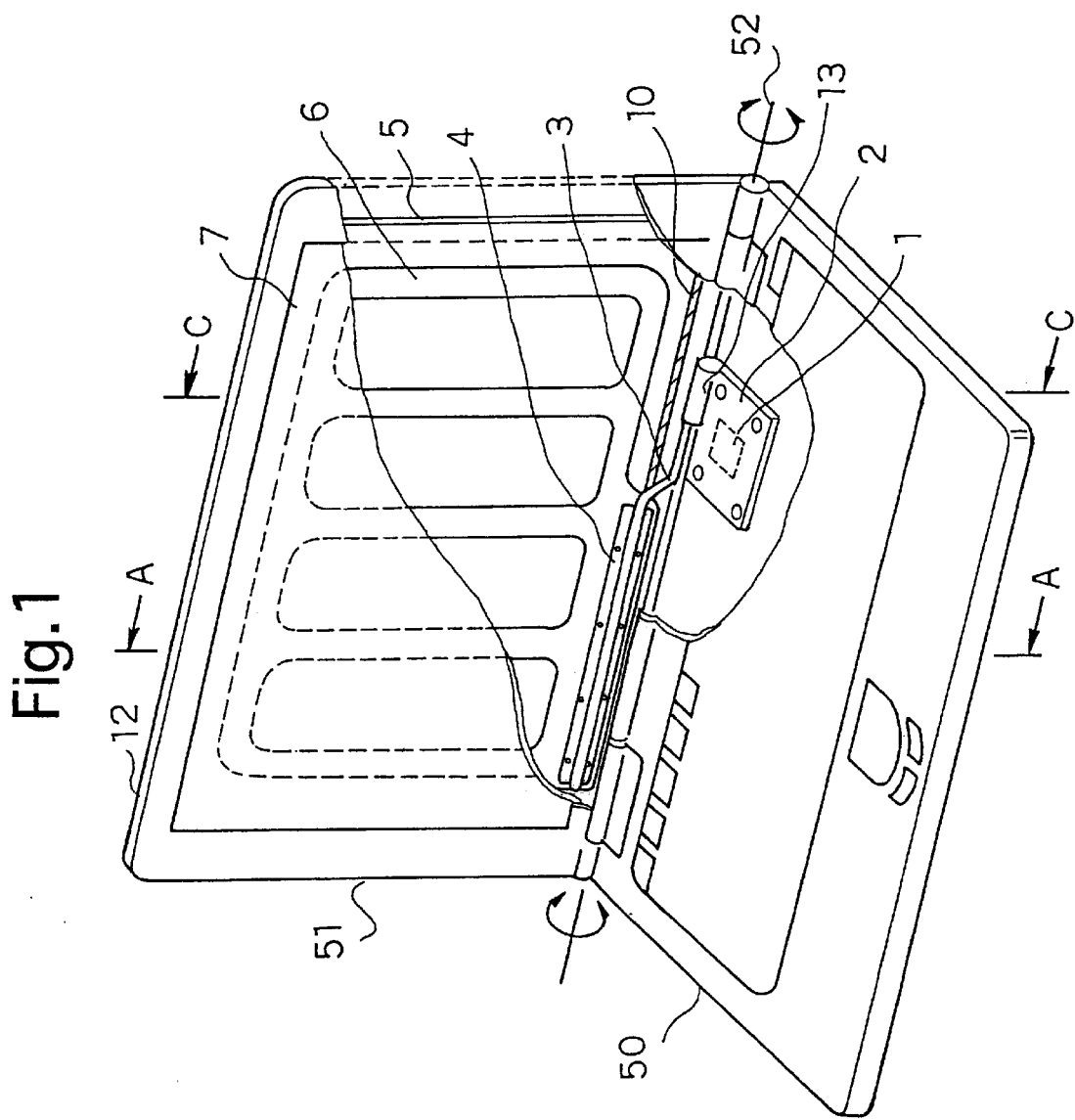
FIG. 1 is a side view of one of the embodiments of the invention.

Reference will now be made in detail to the present preferred embodiments of the invention, examples of which are illustrated in the accompanying drawings, wherein like reference numerals indicate like elements throughout the several views.

Embodiment 1.

Hereinbelow, embodiment 1 of the present invention will be described with reference to attached drawings.

Figure 2:
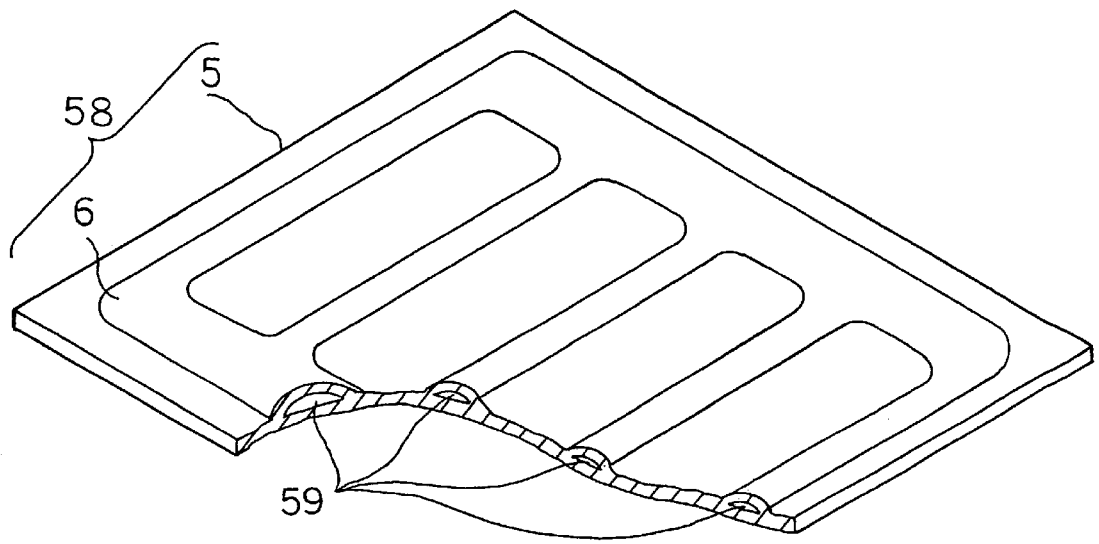
FIG. 2 illustrates a broken section of the thermo-siphon and the heat spreading board of one of the embodiments of the invention.
Figure 3:
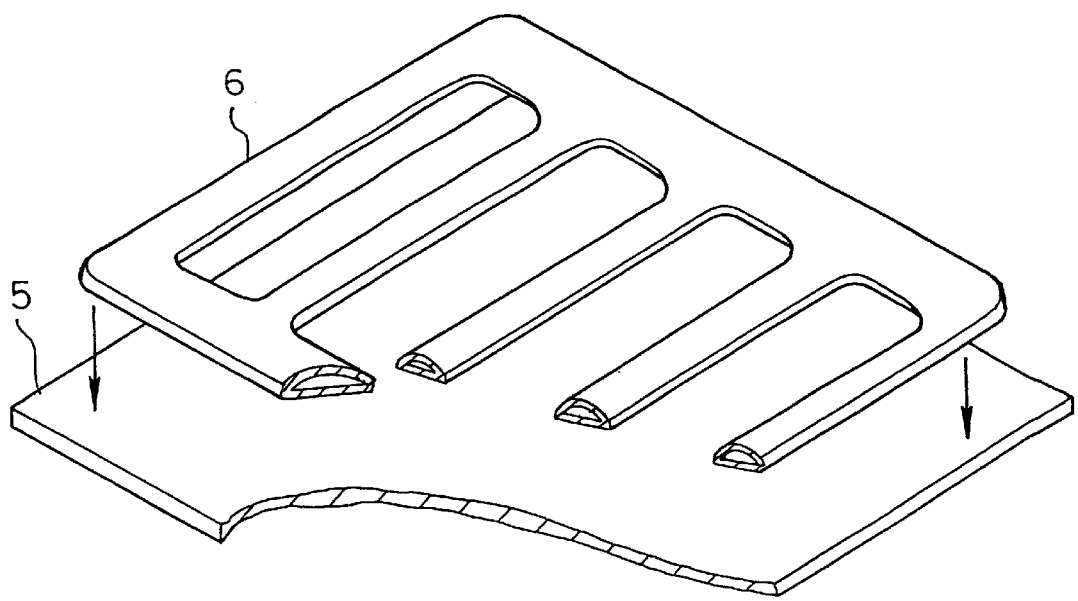
FIG. 3 illustrates a broken section of the thermo-siphon and the heat spreading board of one of the embodiments of the present invention.

Configuration of the mobile information processing apparatus is described with reference to FIG. 1. Description of the numbered components follows: the main body 50 of a notebook type personal computer; the lid 51 for covering the main body 50; a connecting axis 52 having a hinge structure which connects the main body 50 and the lid 51; CPU (Central Processing Unit) 1 which is a heat generation unit; and the thermally conductive block 2 having a hinge 13 for efficiently collecting heat of CPU and conducting this heat to the heat pipe 3. The thermally conductive block 2 can be made of any material such as metal or carbon, as long as it is thermally conductive material. An axis of the hinge 13 of the thermally conductive block 2 is same as the connecting axis 52. The heat pipe encloses an adequate amount of liquid (hereinafter a working fluid) inside an exhausted metallic pipe for vaporizing at a fixed temperature. The heat pipe performs highly efficient heat transmission by taking a heat of vaporization at a high temperature side and dissipating heat of condensation at a low temperature side. Inside the heat pipe, the working fluid is circulated by a capillary force of wick having a gutter or a porous structure in a vertical direction installed at an inner wall of the pipe. A fastening board 4 for fastening the heat pipe 3 to the heat spreading board 5 can provide an effective thermal connection. A thermo-siphon 6 can perform highly efficient heat transmission under a same principal as the heat pipe 3. However, normally, gutter or porous structure in the vertical direction is not installed at an inner side of the thermo-siphon 6 such that the working fluid is not circulated using the capillary force of the wick. The working fluid inside the thermo-siphon 6 circulates along flow channel using a gravity. An example of the thermo-siphon 6 is a roll bond panel 58 manufactured by Show a Aluminum Kabushiki Kaisha. As illustrated in FIG. 2, the roll bond panel 58 is formed by placing the two aluminum plates together, and has flow channel 59 that is hollow inside. An advantage of using the roll bond panel is an integral manufacturing of the heat spreading board 5 and the thermo-siphon 6. However, the heat spreading board 5 and the thermo-siphon 6 can be made independent of one another, as illustrated in FIG. 3. When a surface area of the thermo-siphon 6 is large, there is no need to install the heat spreading board 5. FIG. 1 further shows the followings: the liquid crystal display panel 7, the back light 10; and the external chassis 12 of the lid 51.

Figure 4:
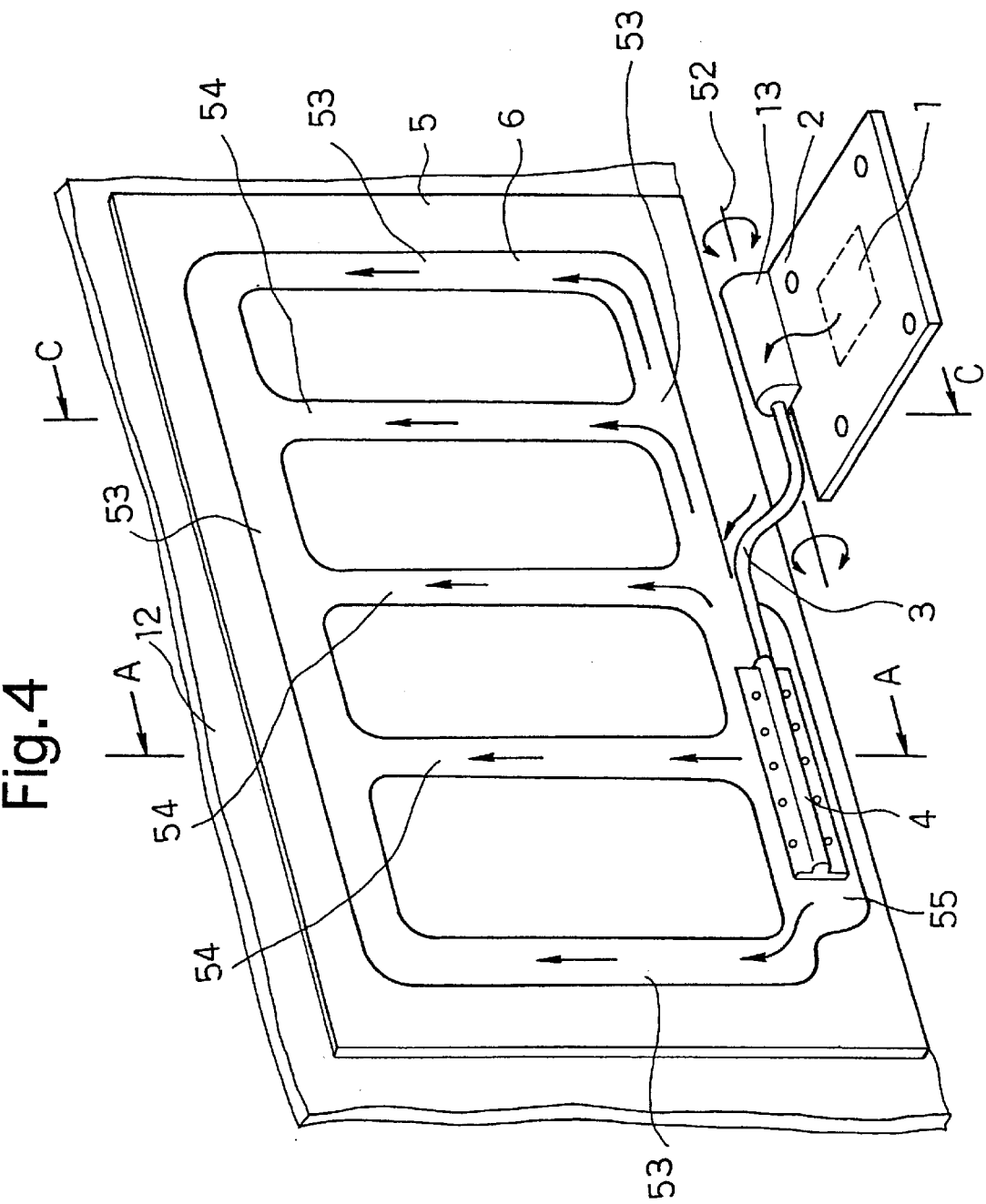
FIG. 4 is a side view of one of the embodiments of the invention.
Figure 5:
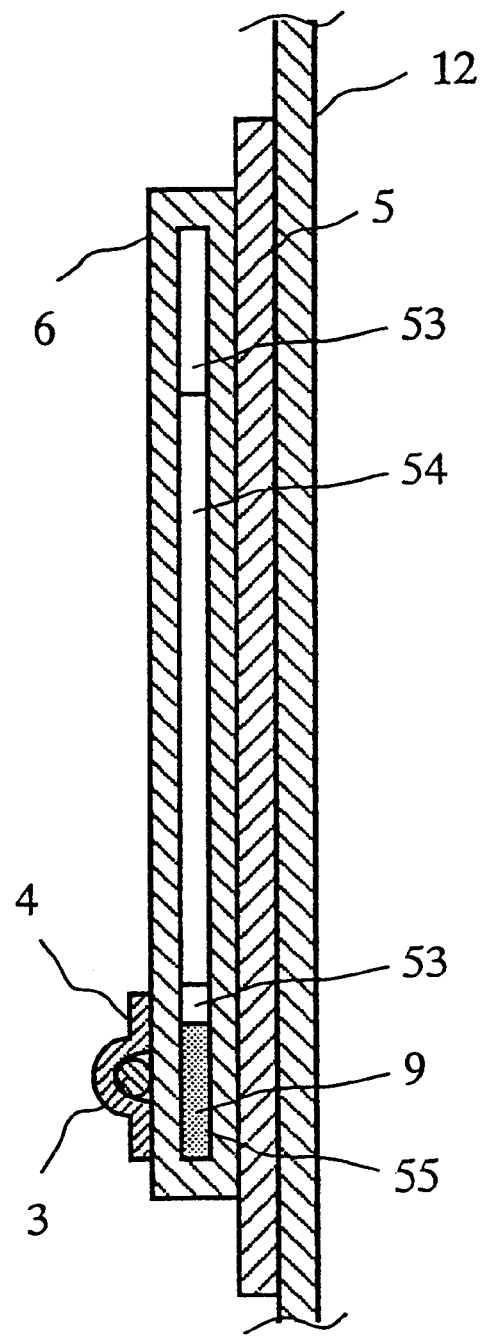
FIG. 5 is a cross-sectional view A—A of FIGS. 1 and 2.

The heat spreading method of the mobile information processing apparatus is described with reference to FIG. 4. FIG. 5 is a cross-section cut through A—A of FIG. 4. The thermo-siphon 6 includes a liquid reservoir 55 for collecting the working fluid. The thermo-siphon 6 further includes vapor flow channels 53 and 54 for circulating the working fluid 9 in the direction of the plane of the heat spreading board 5. A case shown in FIG. 4 illustrates a first flow channel 53 for circulating around a periphery of the heat spreading board 5, and also illustrates second flow channels 54 for extending along to a perpendicular direction to the connecting axis 52, which joins to the first flow channel 53. The heat generated at the CPU1 is conducted to the heat pipe 3 via the thermally conductive block 2, and is transferred to the heat spreading board by means of two-phase flow transfer. At the heat spreading board 5 where the thermo-siphon 6 is formed, the heat is dissipated efficiently by two-phase flow movement, and finally, the heat is dissipated to outer ambient by effects of convection and heat radiation.

Normally, liquid such as fluorinate or water is injected as the working fluid 9 to the liquid reservoir and the flow Is channels. After the injection, the liquid reservoir and the flow channels are decompressed and air-tightly sealed. The working fluid 9 will be collected at a lower part of the liquid reservoir due to an effect of the gravity, however, by making a high temperature heat source such as heat pipe to attach to the lower liquid reservoir, the heat is conducted to the working fluid, which turns it into a vapor to cause an ascending vapor flow to a lower temperature part. When the heat is transferred accordingly, and the vapor flow is condensed to spread the heat inside the vapor flow channel. The working fluid is liquefied by the condensation and falls down the vapor flow channel under its own weight. That is, inside the thermo-siphon, the heat of vaporization is transferred by the circulation and the flow back of the working fluid under the effect of gravity. An effective heat transfer and the heat equalization occurs by heat transmission processes such as condensation and heat spreading. Comparing a use of the thermo-siphon to the heat conduction by using a metal only, one can expect a large improvement in a cooling capability.

Figure 6:
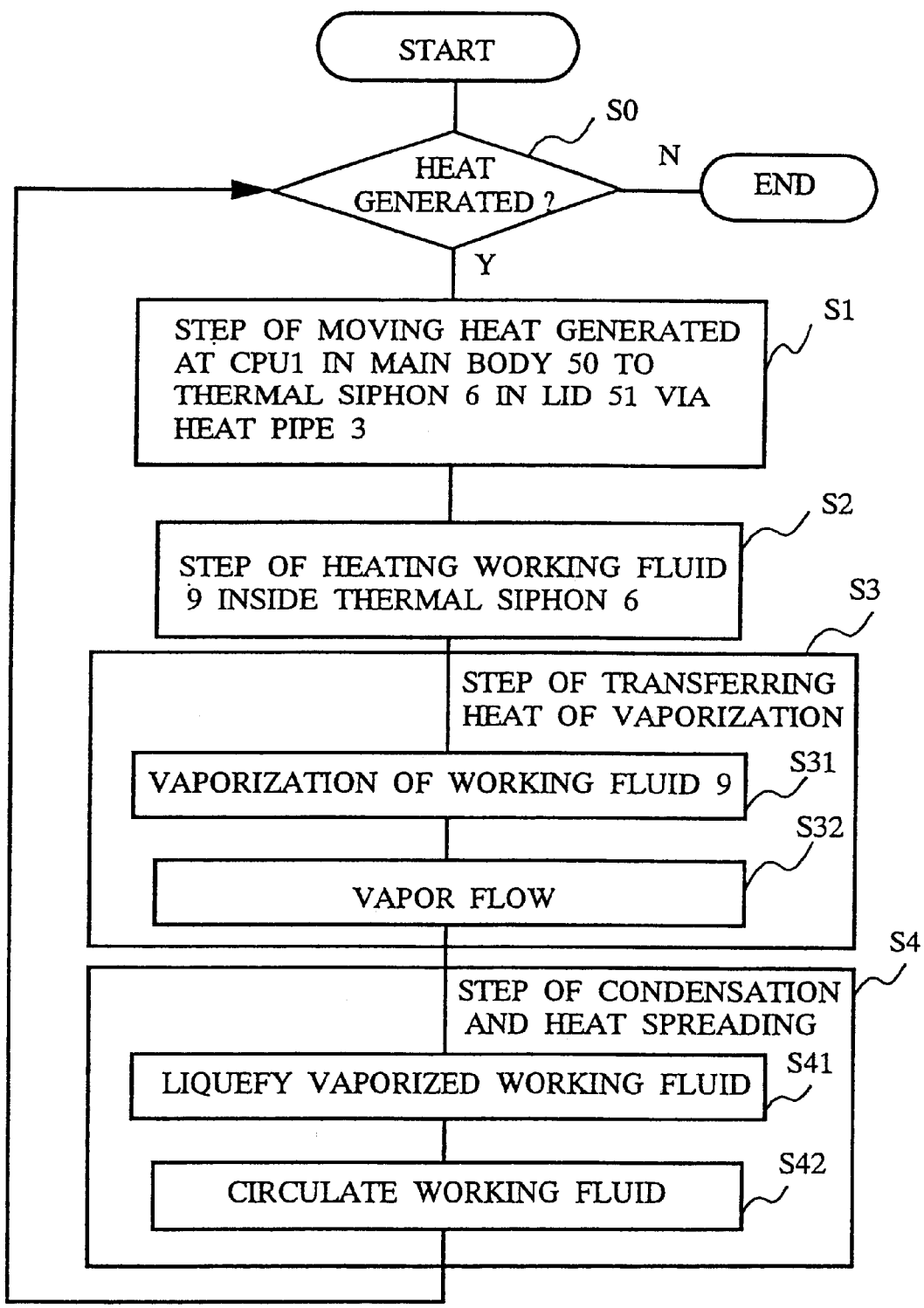
FIG. 6 is a flow chart showing the heat spreading method of one of the embodiments of the invention.

FIG. 6 is a flow chart showing the heat spreading method. In step. S0, if CPU1 is not generating heat, the heat spreading process will not occur at all. If the CPU1 which is installed on the main body 50 generates heat, in step S1, the heat from the CPU1 is transferred to the thermo-siphon 6 via the heat pipe 3. Next, in step S2, the heat being transferred via the heat pipe 3 heats up the working fluid 9. Step S3 is a step to transfer the heat of vaporization. The step S3 includes a step of vaporizing the working fluid 9 (S31) and a step of circulating a vapor flow inside the vapor flow channel (S32). Next, step S4 is a step for spreading heat by the condensation of the vapor flow. The step S4 includes a step of liquefying the vaporized working fluid 9 (S41) and a step of returning the working fluid 9 through the vapor flow channel back into the liquid reservoir (S42). Accordingly, an operation from step S1 to S4 is repeated as long as the heat continues on to be generated.

The thermo-siphon 6 has a thickness of 1~12 mm, therefore, this is made much thinner than a case of installing a fan. Also, the fan will not be needed even for CPU which desires a use of the fan, and the thermo-siphon 6 can bring about a greater heat spreading effect over the fan.

Figure 7:
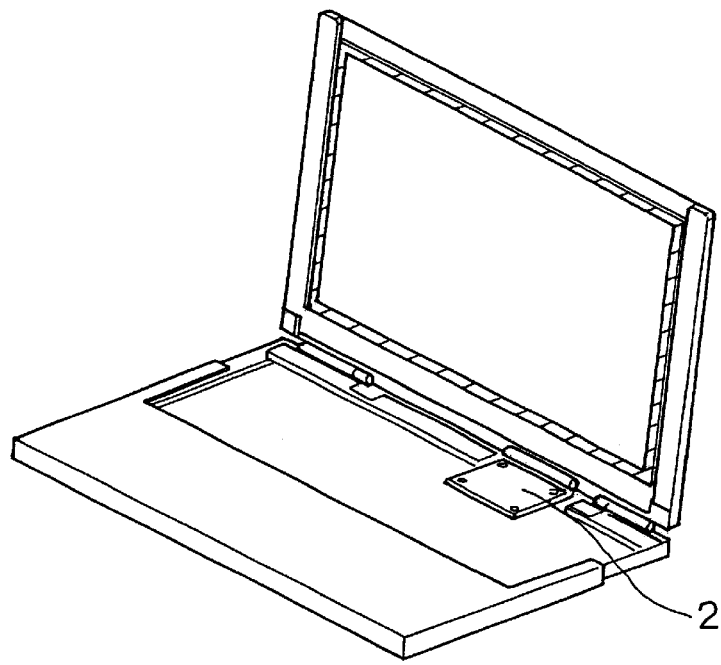
FIG. 7 illustrates a conventional heat spreading structure.
Figure 8:
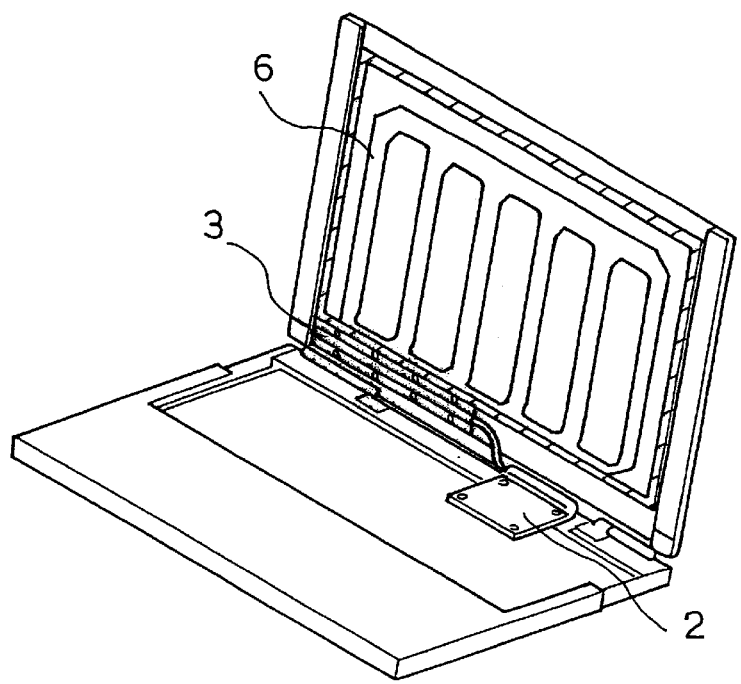
FIG. 8 illustrates a heat spreading structure of the present invention.

This time, a comparison and an experimental study of the cooling function for two types of information processing apparatus as illustrated in FIGS. 7 and 8 were performed. FIG. 7 illustrates a conventional heat spreading structure using the thermally conductive block 2 of the main body 50. Hereinafter, the structure illustrated in FIG. 7 is referred to as configuration 1. FIG. 8 illustrates a heat spreading structure of the present embodiment using the heat pipe 3 and the thermo-siphon 6. Hereinafter, the structure illustrated in FIG. 8 is referred to as configuration 2. The experiment was performed under conditions stated below.

(1) Heat Generating Condition

| CPU | 10 W |
|---|---|
| Main board (M/B) | 5 W |

(2) Dummy Chassis Condition
chassis of the main body
  chassis cover: resin
  bottom chassis: iron (which has equivalent thermal conductivity as Mg) chassis of the lid
  front surface: iron
  back surface:
    0.7 mmt Al for configuration 1
    1.8 mmt roll bond for configuration 2
  dummy CPU: ceramic heater
  thermally conductive block: 3 mmt Al
  dummy M/B: heat tolerant resin and tape heater
  keyboard (K/B): rubber type K/B Under the conditions stated as per above, it is supposed that CPU consumes 10 W of electricity and the memory board consumes 5 W of electricity, this gives a total electricity consumption of 15 W. The resulting temperatures at various positions of the chassis are illustrated in FIG. 9 for both configurations. In conclusion, a natural cooling is possible up to CPU 10 W for configuration 2.

Figure 11:
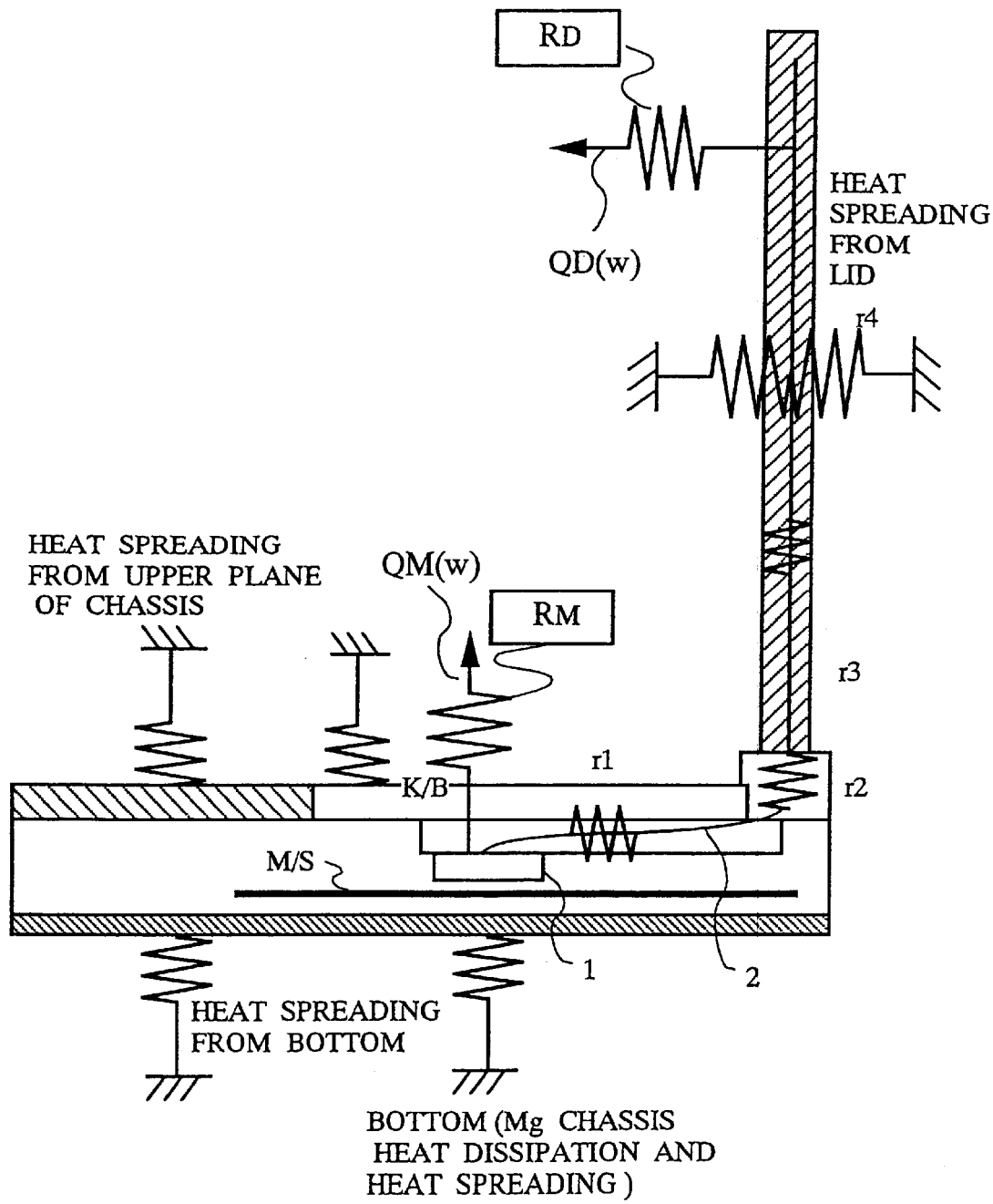
FIG. 11 outlines thermal resistance at various positions of the information processing apparatus.
Figure 12:
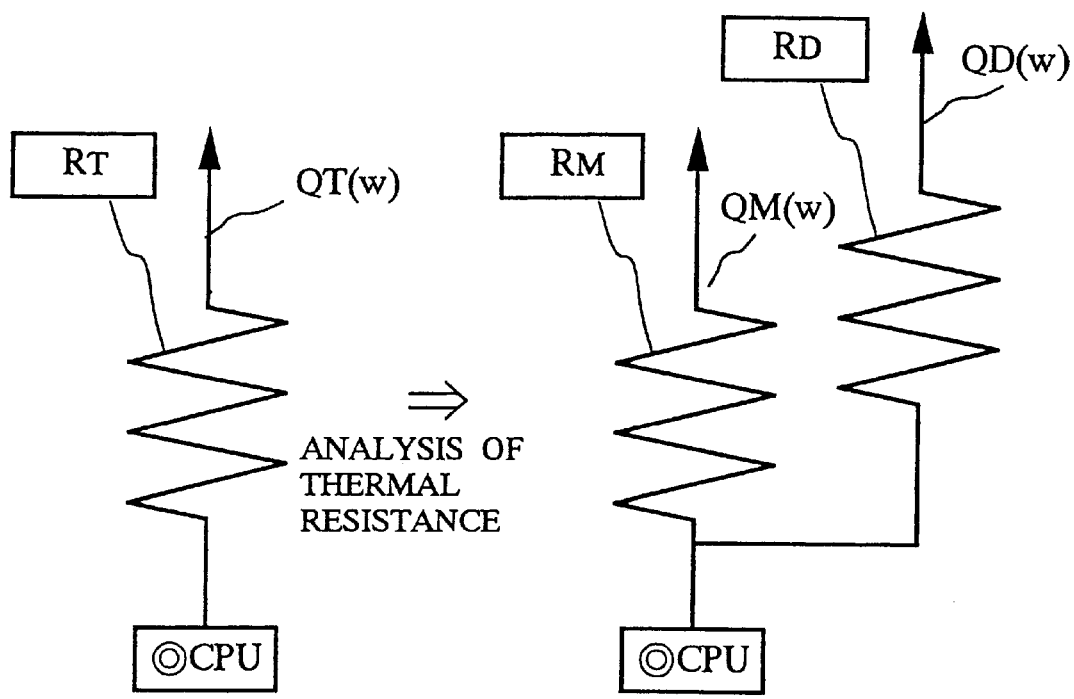
FIG. 12 illustrates a detailed analysis of the thermal resistance.

Heat spreading balance and analysis of the lid and the main body is described with reference to FIGS. 10 to 12.

Effect of the heat pipe 3 largely relies on an effective use of the lid surface as a heat spreading radiator for dissipating the heat transferred from the main body. Based on the experimental study, a proportion of a total thermal resistance $R_M$ of the main body and a total thermal resistance $R_D$ of the lid is calculated, to examine an amount of heat spreading at the lid.

Based on the experimental data for configuration 1, a total thermal resistance of the main body $R_{T1}$ is found to be $R_{T1}=R_M=5.2$K/W. For configuration 2, a total thermal resistance $R_{T2}$ is found to be 2.5K/W.

The $R_{D2}$ is calculated to be 4.8K/W using the expression below.

$$1/R_{T2}=1/R_M+1/R_{D2}$$

For Configuration 2,
$Q_M$ (amount of heat spreading at the main body): $Q_D$ (amount of heat spreading at the lid)
$=R_{D2}$ (thermal resistance at the lid): $R_M$ (thermal resistance at the main body)
=4.8:5.2
=48%:52%

The thermal resistance of main body $R_M$ for configuration 2 is worked out accordingly, and it is estimated that for configuration 2, greater than half of the heat (i.e. 52%) is dispersed to the lid for heat spreading.

Figure 13:
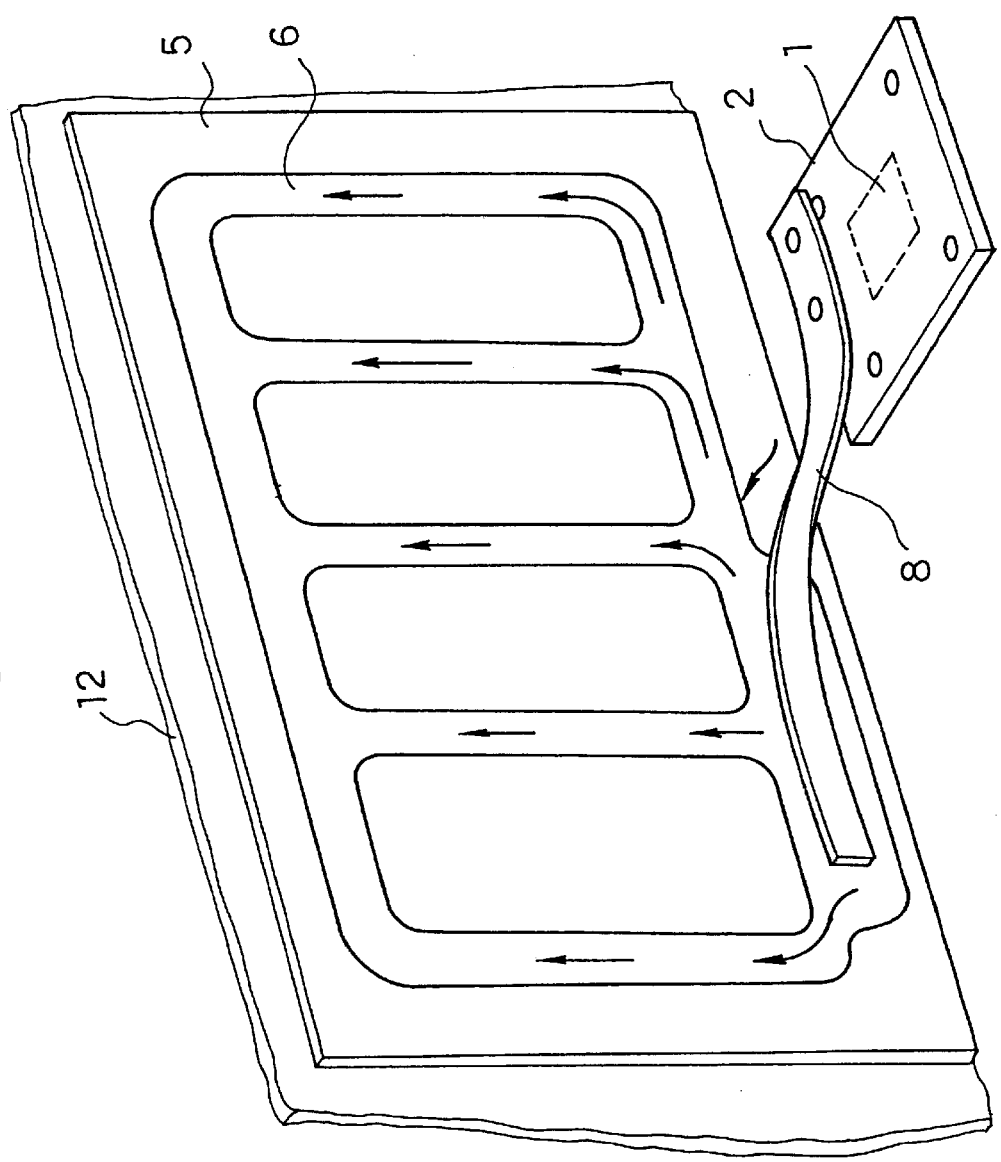
FIG. 13 is a side view of one of the embodiments of the invention.

Example of using a soft sheet will be described with reference to FIG. 13. In a previously described example, the heat pipe 3 is used for thermally connecting the thermo-siphon to the thermally conductive block. Other than this example, a soft sheet 8 with high thermal conductivity such as graphite and carbon fiber can be used instead, as shown in FIG. 7. A similar effect is obtained by using a highly thermal conductive material such as wire rod.

Figure 14:
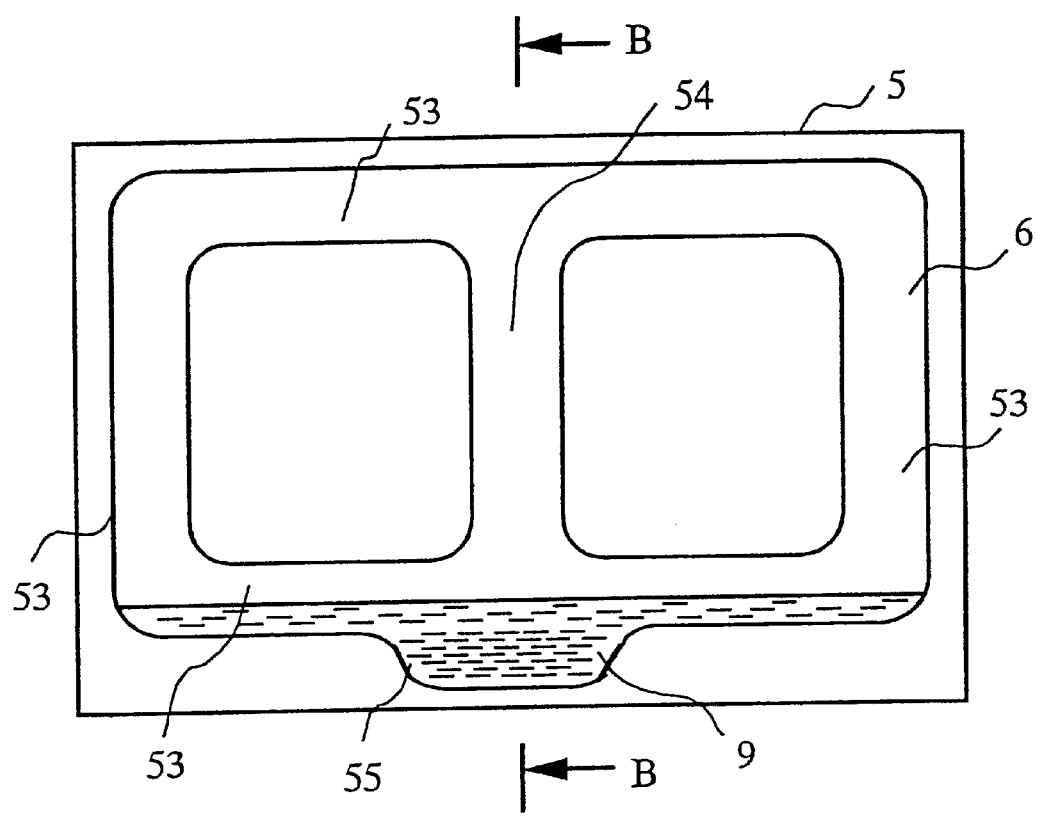
FIG. 14 illustrates configuration of one of the embodiments of the invention.
Figure 15:
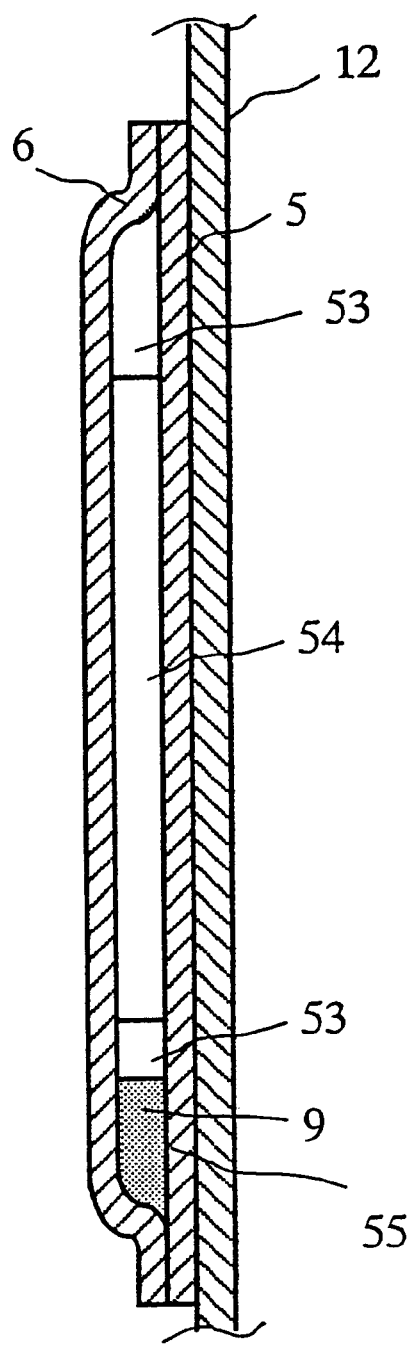
FIG. 15 is a cross-sectional view B—B of FIG. 8.

Another configuration of the thermo-siphon will be described with reference to FIGS. 14 and 15. A chassis illustrated in FIGS. 14 and 15 is formed by the integral manufacturing of the thermo-siphon 6 and the heat spreading board 5. FIG. 15 is a cross-section cut through B—B of FIG. 14. In the present example, the thermo-siphon is formed by rolling the two aluminum plates having high thermal conductivity together, and the liquid reservoir 55 and the vapor flow channels 53 and 54 are formed by expansion in part. An example of this is the roll bond panel of Show a Aluminum Kabushiki Kaisha.

Figure 16:
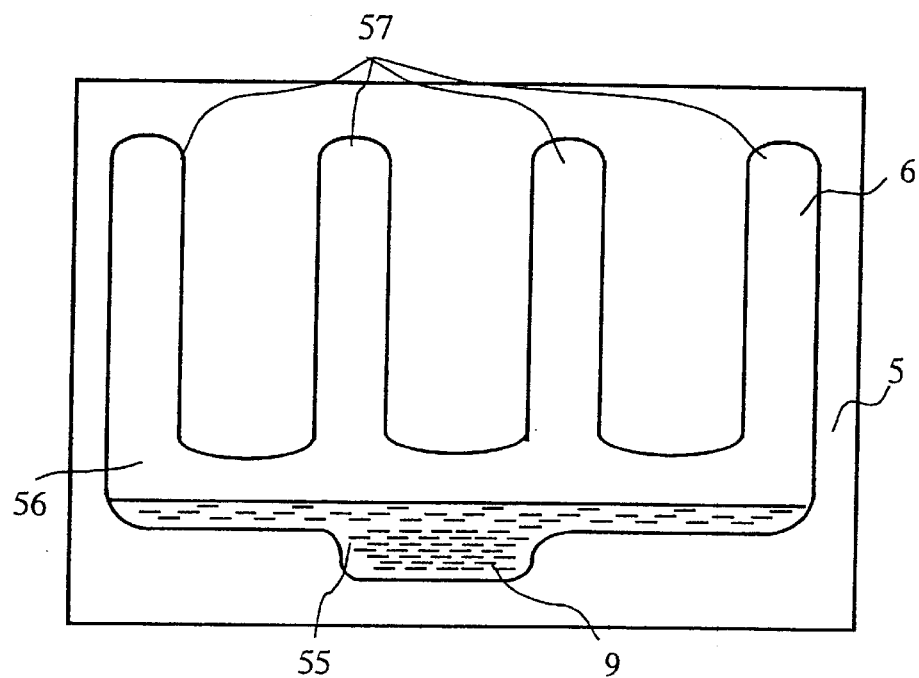
FIG. 16 illustrates configuration of one of the embodiments of the invention.
Figure 17:
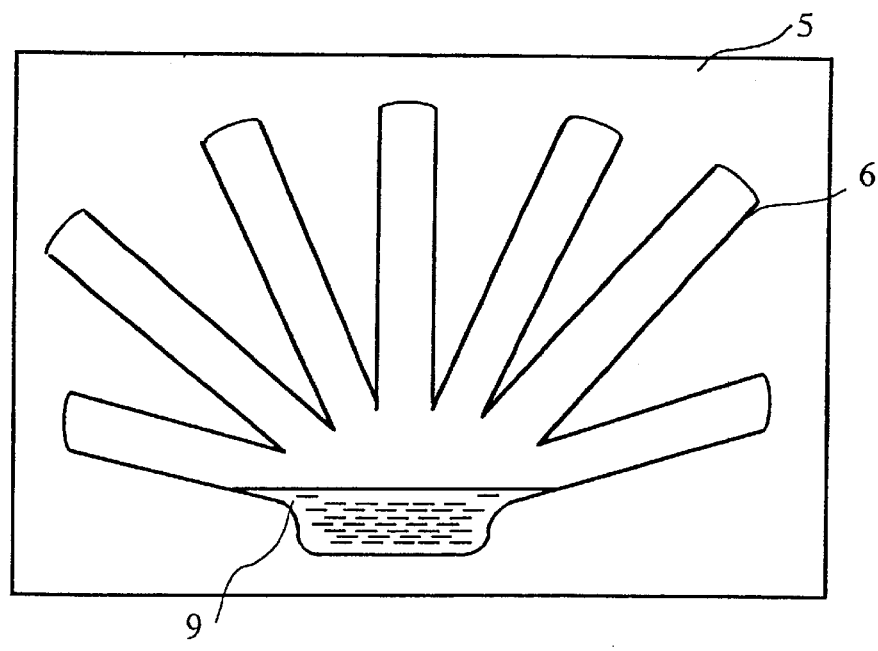
FIG. 17 illustrates configuration of one of the embodiments of the invention.
Figure 18:
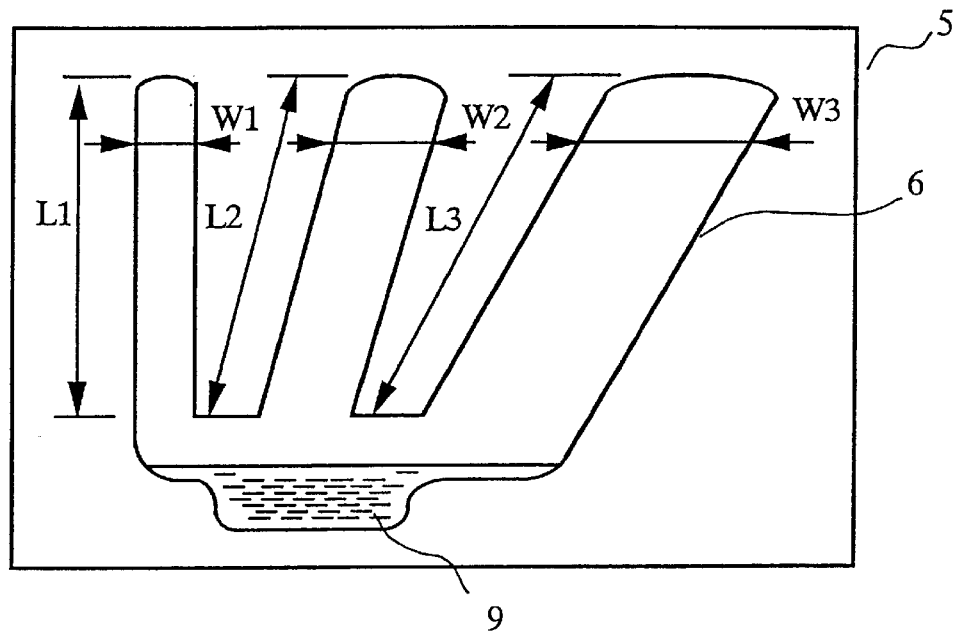
FIG. 18 illustrates configuration of one of the embodiments of the invention.
Figure 19:
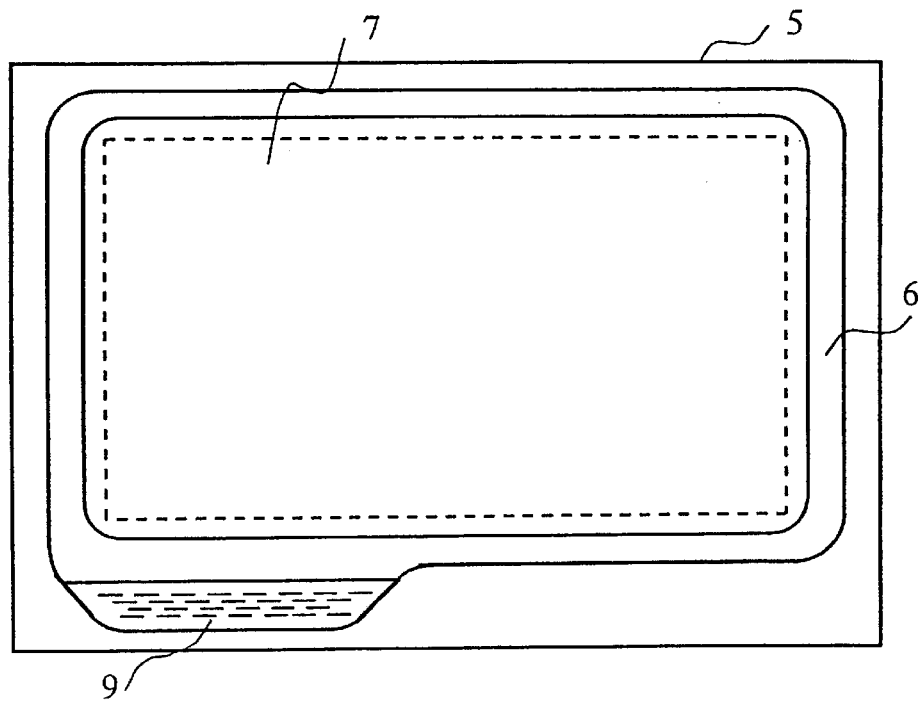
FIG. 19 illustrates configuration of one of the embodiments of the invention.
Figure 20:
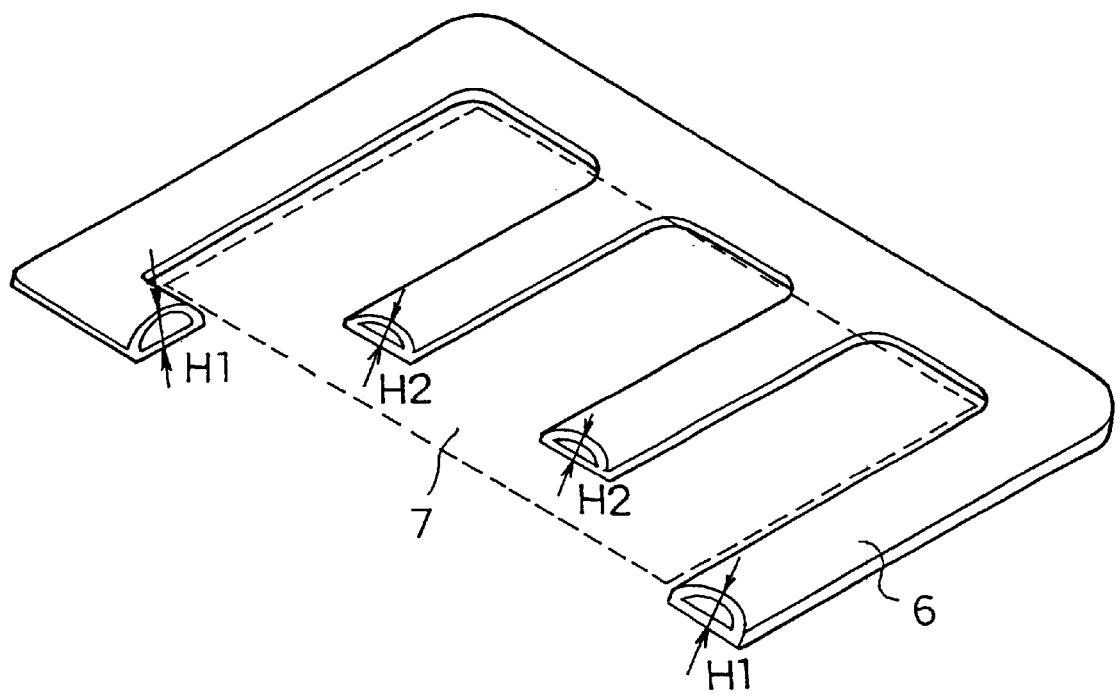
FIG. 20 illustrates configuration of one of the embodiments of the invention.

FIG. 16 illustrates an other example of shapes of the vapor flow channels and the liquid reservoir. In FIG. 16, a third flow channel 56 for extending along to an edge of the heat spreading board 5 close to the connecting axis 52. Fourth flow channels 57 for extending in a direction perpendicular to the connecting axis 52 and its one end joins to the third flow channel. Other than the examples mentioned as per above, a similar effect can be obtained as long as the vapor flow channels have a pipe structure with the working fluid collected in the liquid reservoir. For instance, the configuration of the thermo-siphon may be a radiating pattern as illustrated in FIG. 17. Also, the pattern can have varying lengths of the flow channels L1<L2<L3 with corresponding varying widths of the flow channels W1<W2<W3, as illustrated in FIG. 18. FIG. 19 illustrates an attempt to make a thickness of the lid 51 thinner, by installing the flow channel to a position where the liquid crystal display panel 7 does not exist. Alternatively, as illustrated in FIG. 20, the height (H2)

of a flow channel running over the liquid crystal display panel 7 can be made smaller than the height (H1) of a flow channel surrounding the liquid crystal display panel 7.

Figure 21:
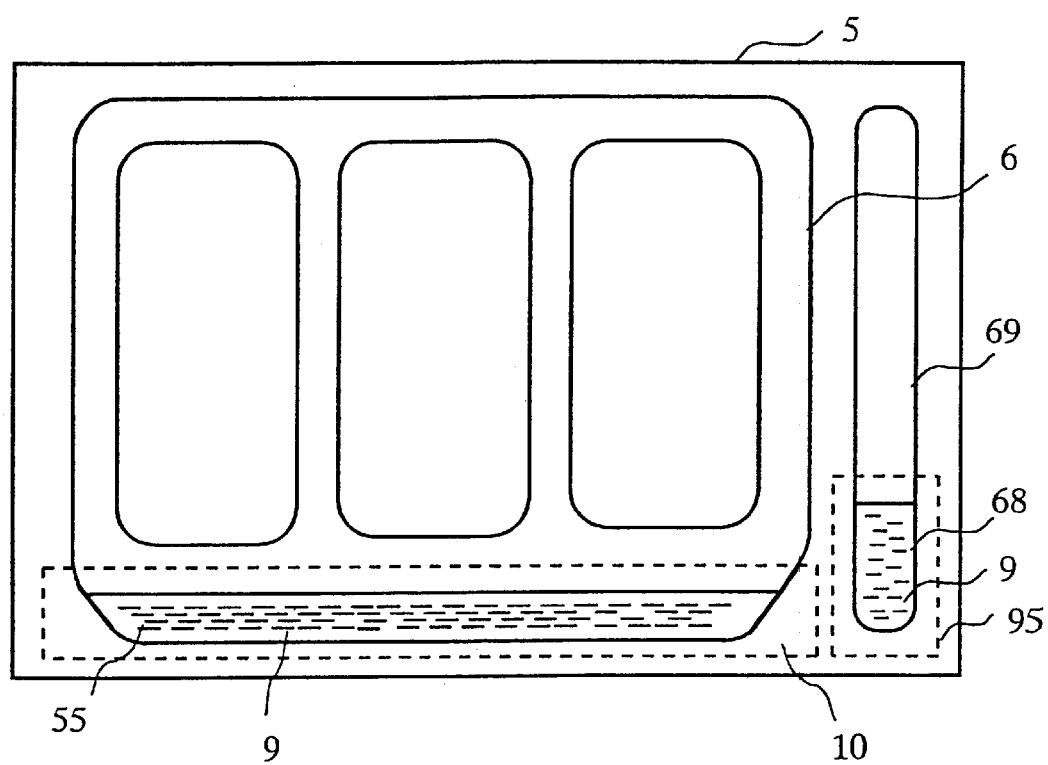
FIG. 21 illustrates configuration of one of the embodiments of the invention.

FIG. 21 illustrates a case of installing a liquid reservoir 68 of a thermo-siphon 68 to correspond with a position of the inverter circuit board 95. This also illustrates a case of installing a liquid reservoir 55 of the thermo-siphon 6 to correspond with a position of the back light 10. Both thermo-siphons 6 and 68 are used in cooling the heat from the CPU1 as well as in spreading the heat from the back light 10 and the inverter circuit board 95. Accordingly, the thermo-siphons are used effectively in cooling the heating components such as CPU 1, back light 10 and inverter circuit board 95.

Figure 22:
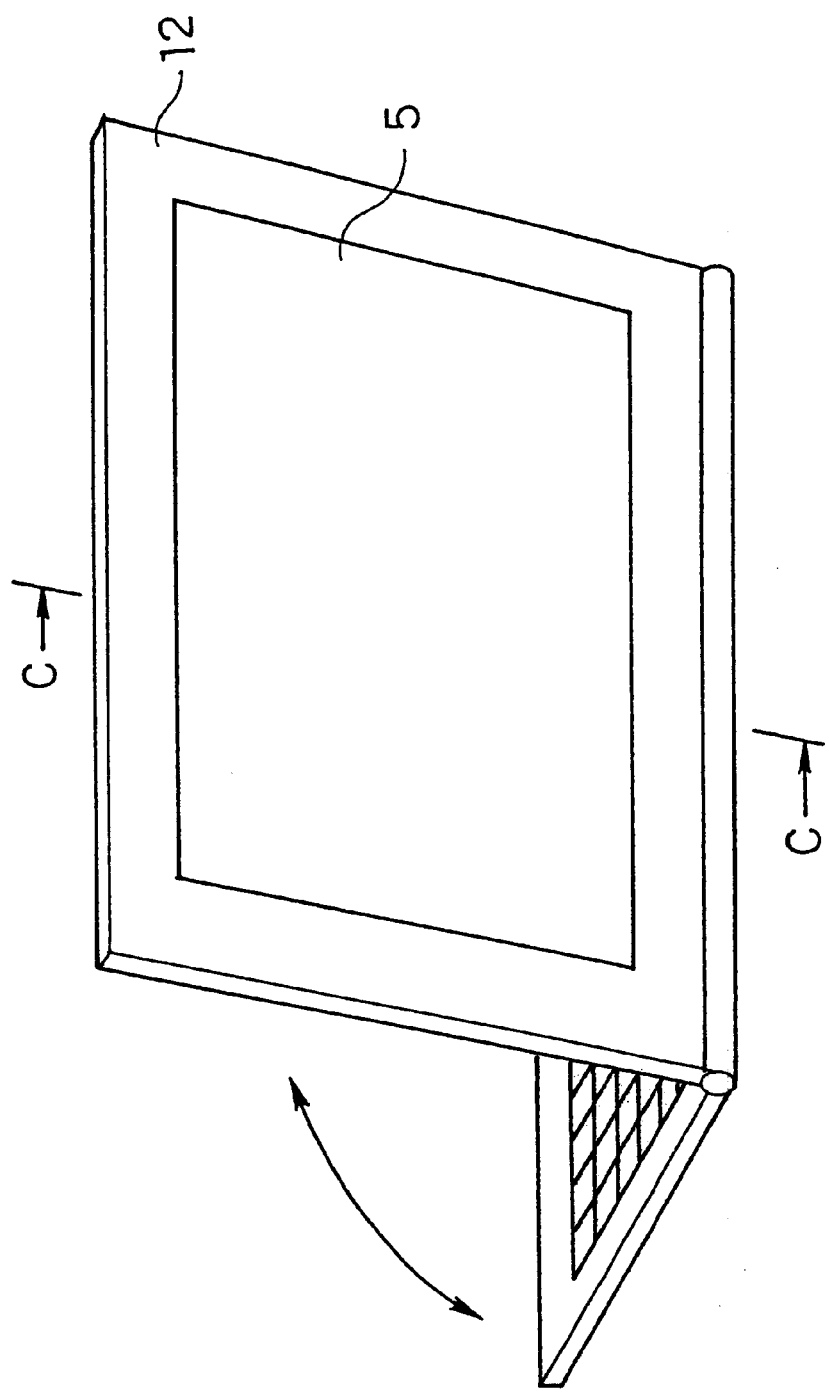
FIG. 22 illustrates configuration of lid for one of the embodiments of the invention.
Figure 23:
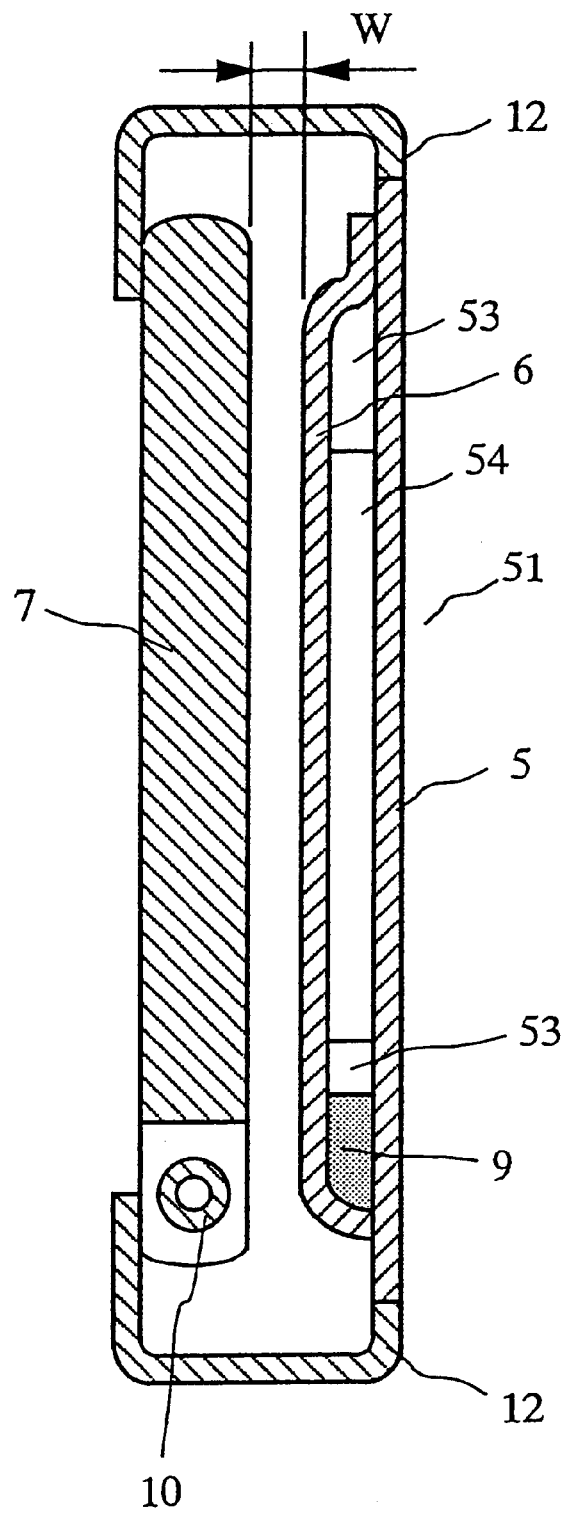
FIG. 23 is a cross-sectional view of one of the embodiments of the invention.

A configuration that opened a gap in between the heat spreading board 5 and the liquid crystal display panel 7 is described, along with its advantage, with reference to FIGS. 22 and 23. FIG. 22 illustrates the lid 51 viewed from outside. FIG. 23 is across-section cut through C—C of FIG. 22. The external chassis 12 of the lid 51 is shown in FIG. 22. As can be seen from FIG. 16, the heat spreading board 5 is exposed by installing it as one part of the external chassis 12 of the lid 51.

For the liquid crystal display panel adopting a thin film transistor (TFT), a temperature difference inside the liquid crystal display panel needs be controlled, because, due to a temperature dependency of a liquid crystal, this can cause a color variation and a display inconsistency of the panel. In FIG. 22, the gap of several mm (W) is provided in between the liquid crystal display panel 7 and the thermo-siphon 6 or the heat spreading board 5, therefore, this gap will act as a heat insulating layer to prevent the heat of the heat spreading board to conduct to the liquid crystal not to cause a raised temperature of the liquid crystal.

Figure 24:
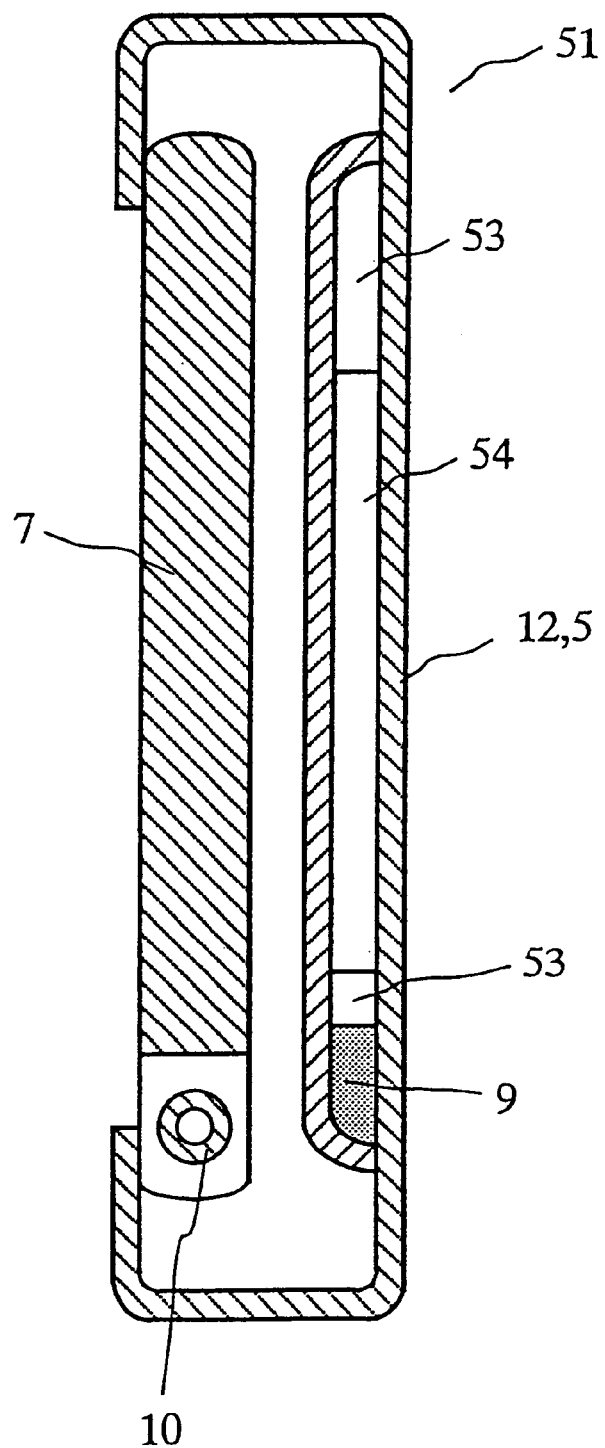
FIG. 24 is a cross-sectional diagram C—C of FIG. 9.

FIG. 24 illustrates a case of using the chassis 12 as the heat spreading board 5. The chassis 12 is also possible to be made by the aluminum plates. Therefore, the chassis 12 can be used as the heat spreading board itself. Alternatively, it is possible to use the chassis 12 as the thermo-siphon 6.

Figure 25:
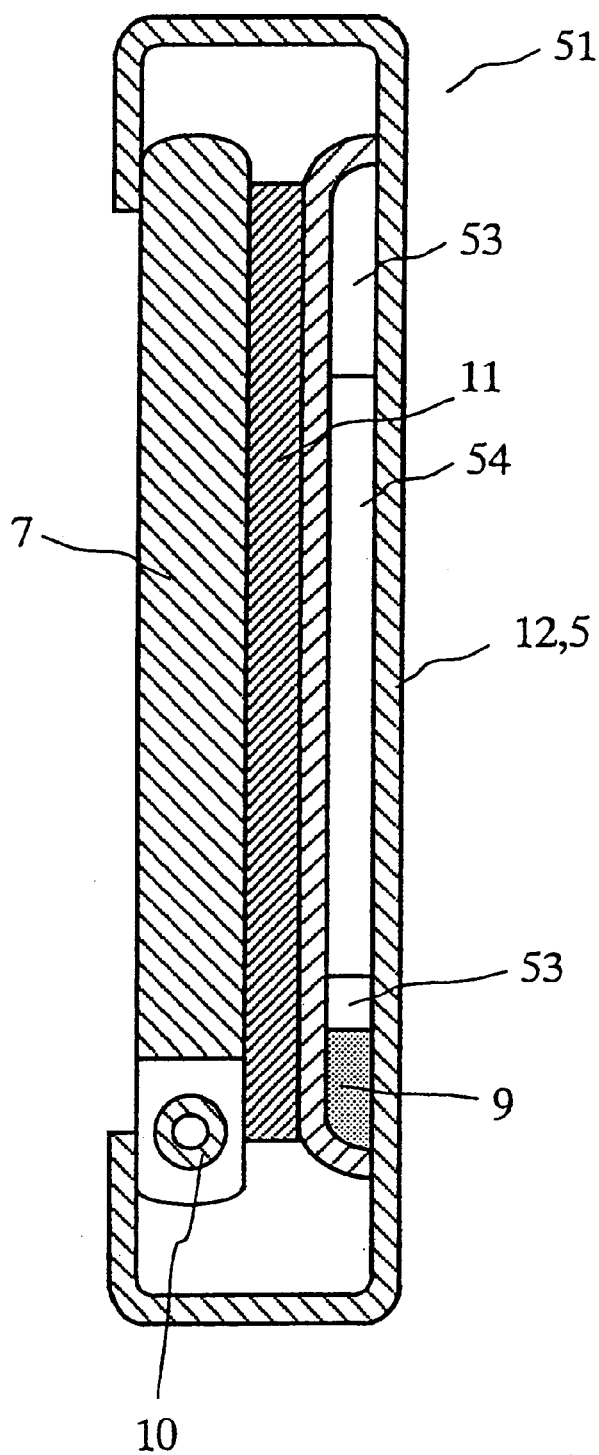
FIG. 25 is a cross-sectional diagram C—C of FIG. 9.

A configuration to sandwich a thermally conductive sheet in between the heat spreading board and the liquid crystal display panel is described, along with its advantage, with reference to FIG. 25.

If a temperature of the heat spreading board is not so high, or if a temperature difference within the liquid crystal display panel 7 is largely occurring due to a heat generated from the back light, by arranging the liquid crystal panel 7 to attach with the heat spreading board 5 and the thermo-siphon 6 via the thermally conductive sheet 11, the whole set of these components are cooled altogether. Accordingly, by making the temperature profile of the liquid crystal display panel 7 constant, the display inconsistency is eliminated which can increase a display quality.

It is desirable to use an elastic material with a good thermal conductivity as the thermally conductive sheet 11 such as silicon and rubber. By using the elastic material, for components such as the liquid crystal display panel 7 and the heat spreading board 5, as well as the liquid crystal display panel 7 and the thermo-siphon 6 will be adhered together without allowing a gap in between them. The reason for using the elastic material is because the elastic material absorbs and fills-in the dents on a surface of the thermo-siphon which is formed by the vapor flow channels, so that the components will be adhered together without allowing any gap in between them.

Also, on one side of the liquid crystal display panel 7, a high frequency inverter circuit board 95 is placed. The high frequency inverter circuit board 95 has a circuit for turning on the back light. The thermally conductive sheet is used as an insulating sheet, which prevents the leakage current to flow from the high frequency inverter circuit board 95 to the chassis 12 or to the heat spreading board 5. That is, the leakage current is insulated by the insulating sheet, and the current will not flow to the chassis 12 or to the heat spreading board 5.

In the previously described example, the thermally conductive and insulating sheet is used, however, only the thermally conductive sheet may be used. Or, the insulating sheet only may be used.

Instead of the heat pipe, a metal rod having high thermal conductivity or a carbon material which also has high thermal conductivity may be used. Similar effects as in the heat pipe are obtained by using the metal rod and the carbon material having high thermal conductivity.

The invention can be applied not only to the notebook type personal computer but also can be applied to others such as hand-held information processing apparatus, mobile telephone and mobile facsimile machine.

According to embodiment 1 of the present invention, since the thermo-siphon is installed on the heat spreading board, the working fluid sealed inside the thermo-siphon will circulate in the direction of the plane of the heat spreading board, and the temperature profile of various positions of the heat spreading board is therefore equalized. As a result of this, heat generated by the heat generation unit is dissipated throughout the heat spreading board by the thermo-siphon, which can effectively use all of its board as an actual heat spreading area in releasing heat to outside.

According to embodiment 1 of the present invention, since the heat pipe is installed in between the heat generation unit and the heat spreading board, the heat generated from the heat generation unit is effectively transferred via the heat pipe, and the transferred heat is effectively released from the thermo-siphon to outside.

According to embodiment 1 of the present invention, since the heat pipe is attached to the liquid reservoir of the thermo-siphon, the working fluid collected in the liquid reservoir is easily boiled by the heat from the heat pipe. Then the vapors from boiling the working fluid will repeat processes of moving, condensing, and liquefying and flowing back inside the thermo-siphon, therefore, the heat of the heat pipe is transferred throughout the plane of the heat spreading board, and is dispersed. As a result of this, the heat of the heat pipe is effectively released from throughout the plane of the heat spreading board to outside.

According to embodiment 1 of the present invention, the thermally conductive block is installed to the heat generation unit, and the heat pipe is inserted to the hinge of this thermally conductive block, therefore, the heat generated at the heat generation unit is efficiently conducted to the heat pipe via the thermally conductive block. Because of this, even if there is no area available to let go of the heat of an inner part of the main body due to thinning of the main body, the heat generated at the heat generation unit is easily transferred and released to an outer part of the main body, via the thermally conductive block.

According to embodiment 1 of the present invention, by installing the soft sheet in between the heat generation unit and the heat spreading board, the heat generated at the heat generation unit is easily released from the thermo-siphon to the outer part, via the soft sheet. Also, the soft sheet allows a flexible hinge movement.

According to embodiment 1 of the present invention, a material with good thermal conductivity such as graphite and carbon material is used as the soft sheet, therefore, the heat generated at the heat generation unit is easily conducted to the heat spreading board through graphite or carbon material.

According to embodiment 1 of the present invention, the thermo-siphon is provided with the first flow channel for circulating around the periphery of the heat spreading board in which the working fluid circulates through to equalize the temperature profile around the periphery of the heat spreading board. The thermo-siphon also is provided with the second flow channel for extending along to the direction perpendicular to the connecting axis of the main body and the lid, in which the working fluid circulates through to equalize the temperature profile in the central part of the heat spreading board. The working fluid is efficiently circulated at the periphery and the central part of the heat spreading board using the first and the second flow channels, therefore, the temperature profile throughout the whole plane of the heat spreading board is definitely being equalized.

According to embodiment 1 of the present invention, the thermo-siphon is provided with the third flow channel for extending along to the edge of the heat spreading board close to the connecting axis of the main body and the lid, therefore, temperature profile in the direction of the connecting axis on the heat spreading board is equalized. The thermo-siphon is also provided with the fourth flow channel for extending along to the direction perpendicular to the connecting axis from the third flow channel, therefore, the temperature profile in the direction perpendicular to the connecting axis on the heat spreading board is equalized. As such, the working fluid is efficiently circulated at direction perpendicular to the connecting axis and the direction of the connecting axis, therefore, the temperature profile throughout the whole plane of the heat spreading board will definitely be equalized.

According to embodiment 1 of the present invention, the gap is installed in between the heat spreading board and the liquid crystal display panel, therefore, even if some kind of shock is applied from outside, this shock will not be transferred directly to the liquid crystal display panel. Therefore, a damage that may occur on the liquid crystal display panel by the shock from outside is effectively prevented.

According to embodiment 1 of the present invention, the thermally conductive sheet sandwiched in between the heat spreading board and the liquid crystal display panel is made of the elastic material such as silicon, therefore, even if the shock is applied from outside to the heat spreading board, the shock is absorbed by the insulating sheet, and the shock will not be transferred directly to the liquid crystal display panel. Therefore, the damage that may occur on the liquid crystal display panel by the shock from outside is effectively prevented. Also, even when the high frequency inverter circuit board and the metallic chassis or the heat spreading board are arranged to be attached to the liquid crystal display panel, any leakage current will be insulated by the thermally conductive sheet such that no leakage current occurs to a large extent.

A problem in conventional heat spreading configuration of the mobile information processing apparatus is failing in an attempt to improve the thermal conductivity of the heat spreading board in the direction of its plane. By installing the thermo-siphon to the liquid crystal display panel, the heat spreading area is increased which can make a rapid improvement in the heat spreading. Also, by making the gap in between the liquid crystal display panel of the heat spreading board, the temperature profile inside the liquid crystal display panel is controlled and the leakage current is suppressed.

Embodiment 2.

Hereinbelow, embodiment 2 of the present invention will be described with reference to the attached drawings.

Figure 26:
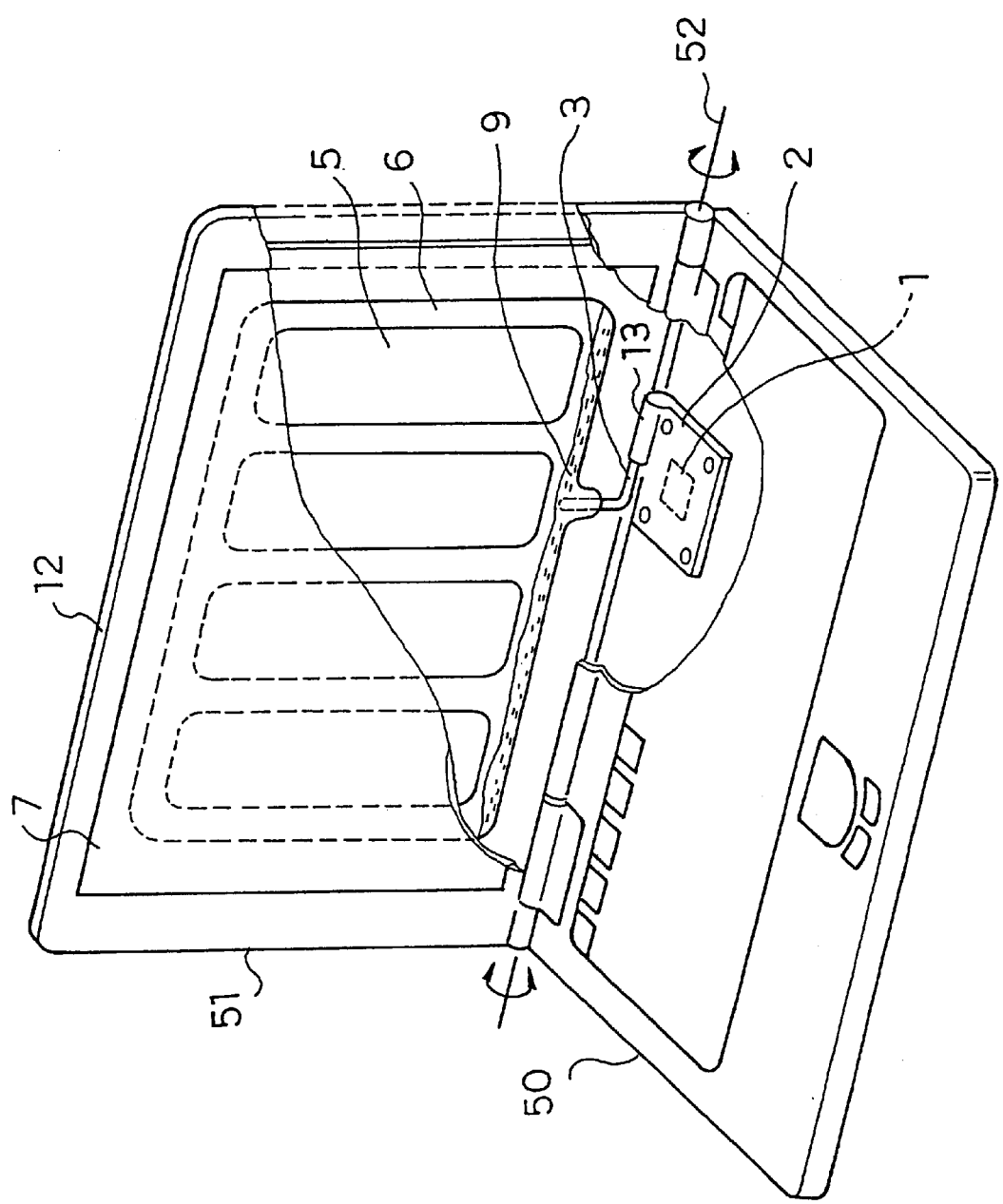
FIG. 26 illustrates a side view of one of the embodiments of the present invention.

Configuration of the mobile information processing apparatus is described with reference to FIG. 26. Different point to note from embodiment 1 is that in FIG. 26, the heat pipe 3 is directly immersed in the working liquid 9.

As a concrete example, after injecting the working liquid 9 inside the roll bond panel, the heat pipe is forced into the roll bond panel and these are sealed by decompressing. The manufacturing of such a cooling structure is easily implemented.

The heat spreading board 5 can be made to expose as a part of the chassis 12. Or, the heat spreading board 5 and the chassis 12 can be manufactured as one part.

Figure 27:
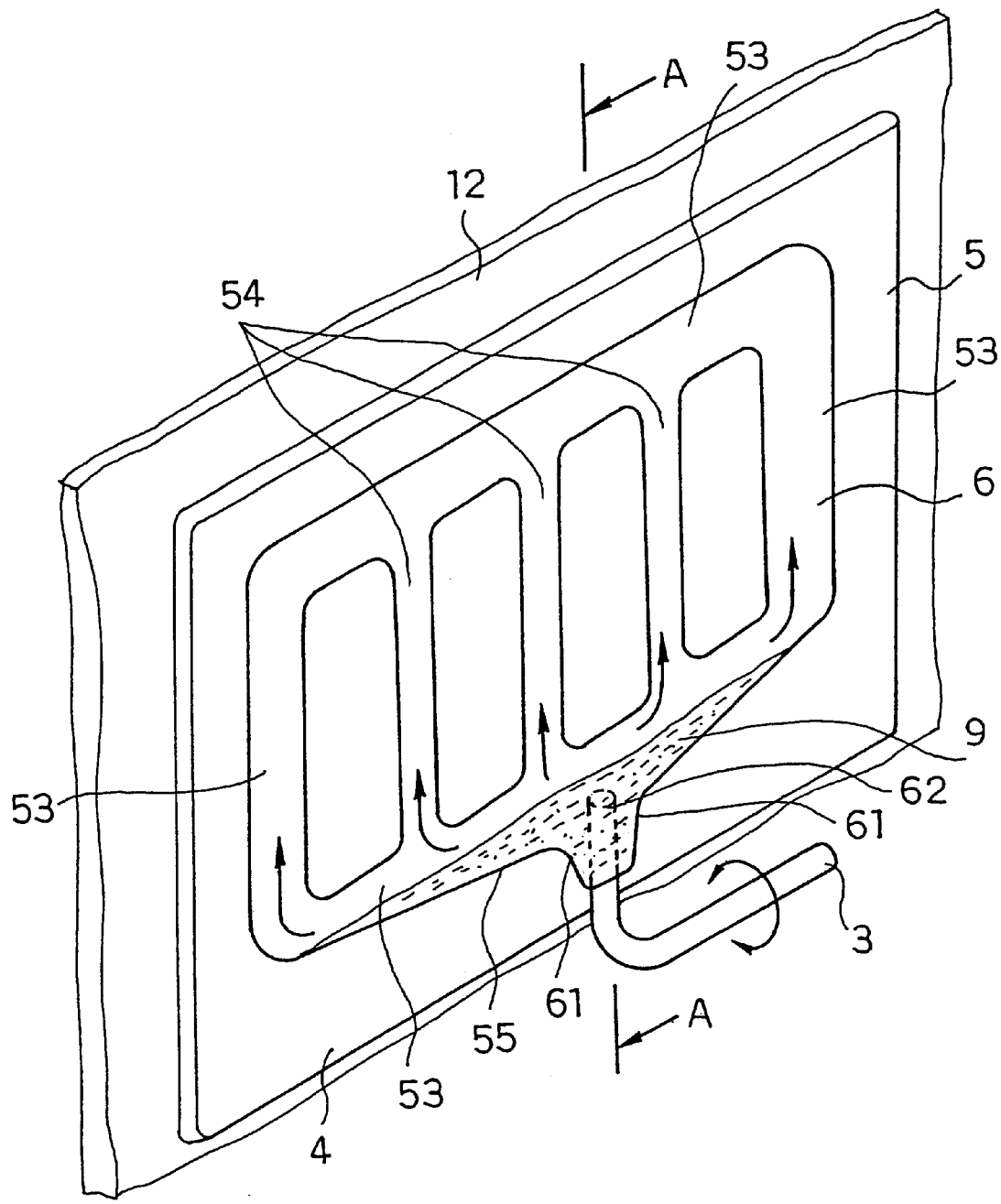
FIG. 27 illustrates a side view of one of the embodiments of the present invention.
Figure 28:
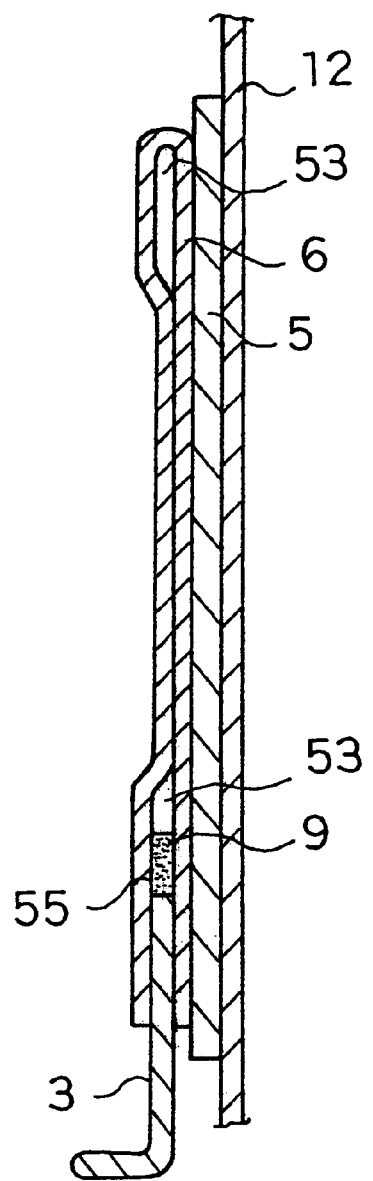
FIG. 28 illustrates a cross-sectional diagram A—A of FIG. 4.

Heat spreading process of the mobile information processing apparatus is described with reference to FIGS. 27 and 28. FIG. 28 is a cross-section cut through A—A of FIG. 27. The thermo-siphon 6 includes the vapor flow channels 53 and 54 for circulating the working fluid 9 in the direction of the plane of the heat spreading board 5. A case shown in FIG. 27 illustrates a first flow channel 53 for circulating around a periphery of the heat spreading board 5, and also illustrates a second flow channel 54 for extending along to a perpendicular direction of the connecting axis 52, which joins to the first flow channel 53.

Normally, the heat pipe is fixed to the metallic chassis or the heat pipe is fixed using a fastener so the heat pipe is directly touching a heat spreading area to allow for the heat to be conducted, transferred and released. However, a main point that is characteristic of the present configuration is that one end of the heat pipe 3, in otherwords, an insertion 62, is inserted to the liquid reservoir 55, so that one end of the heat pipe 3 is immersed in the working fluid 9. The heat generated at the CPU 1 is transferred to the heat pipe 3 via the thermally conductive block 2, then the working fluid 9 is boiled where the heat pipe 3 is being immersed, and the heat is transferred to the heat spreading board 5 by the two-phase heat flow transfer. For this kind of configuration, the heat is effectively dissipated by the two-phase flow movement, then finally the heat is dissipated to the ambient from an expanded heat spreading area by the effects of convection and heat radiation.

Even when the liquid crystal display panel 7 of the lid in the mobile information processing apparatus is being used in an inclined position, a taper 61 which narrows toward a lower part of the liquid reservoir 55 is installed so that the working fluid 9 will still be collected at the insertion 62 of the heat pipe 3. By doing so, the heat pipe 3 will definitely be immersed in the working fluid 9.

Another example is described with reference to FIG. 29.

Figure 29:
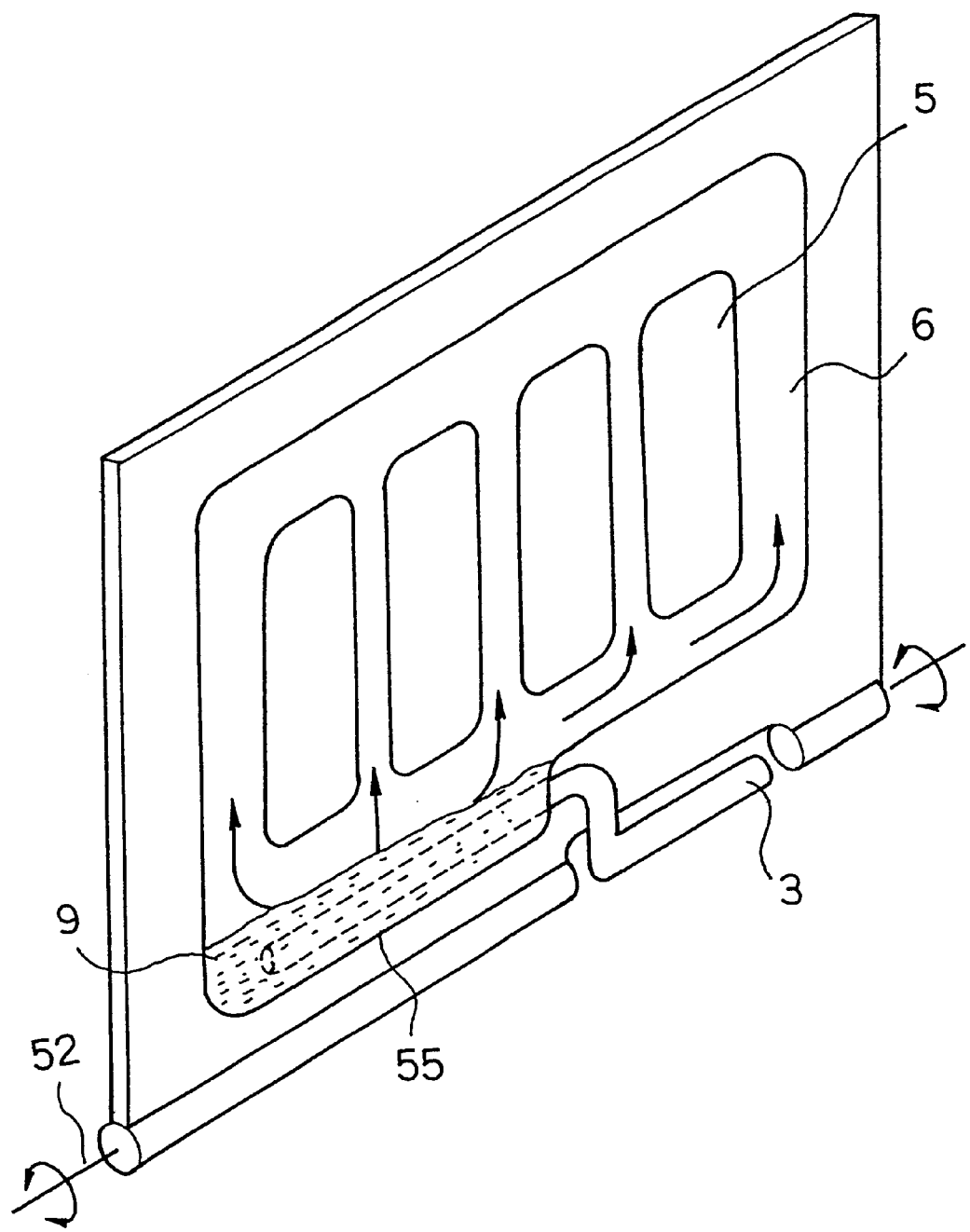
FIG. 29 illustrates a side view of one of the embodiments of the present invention.

As illustrated in FIG. 29, the insertion 62 of the heat pipe 3 can be extended along an axial direction of the connecting axis 52 between the main body and the lid. By doing so, an immersion area of the heat pipe in the working fluid which is collected at the lower part of the liquid reservoir 55 due to the effect of gravity increases, and area of conducting the heat from boiling of the working fluid will also increase. Accordingly, the heat conduction performance improves by increasing this area.

Figure 30:
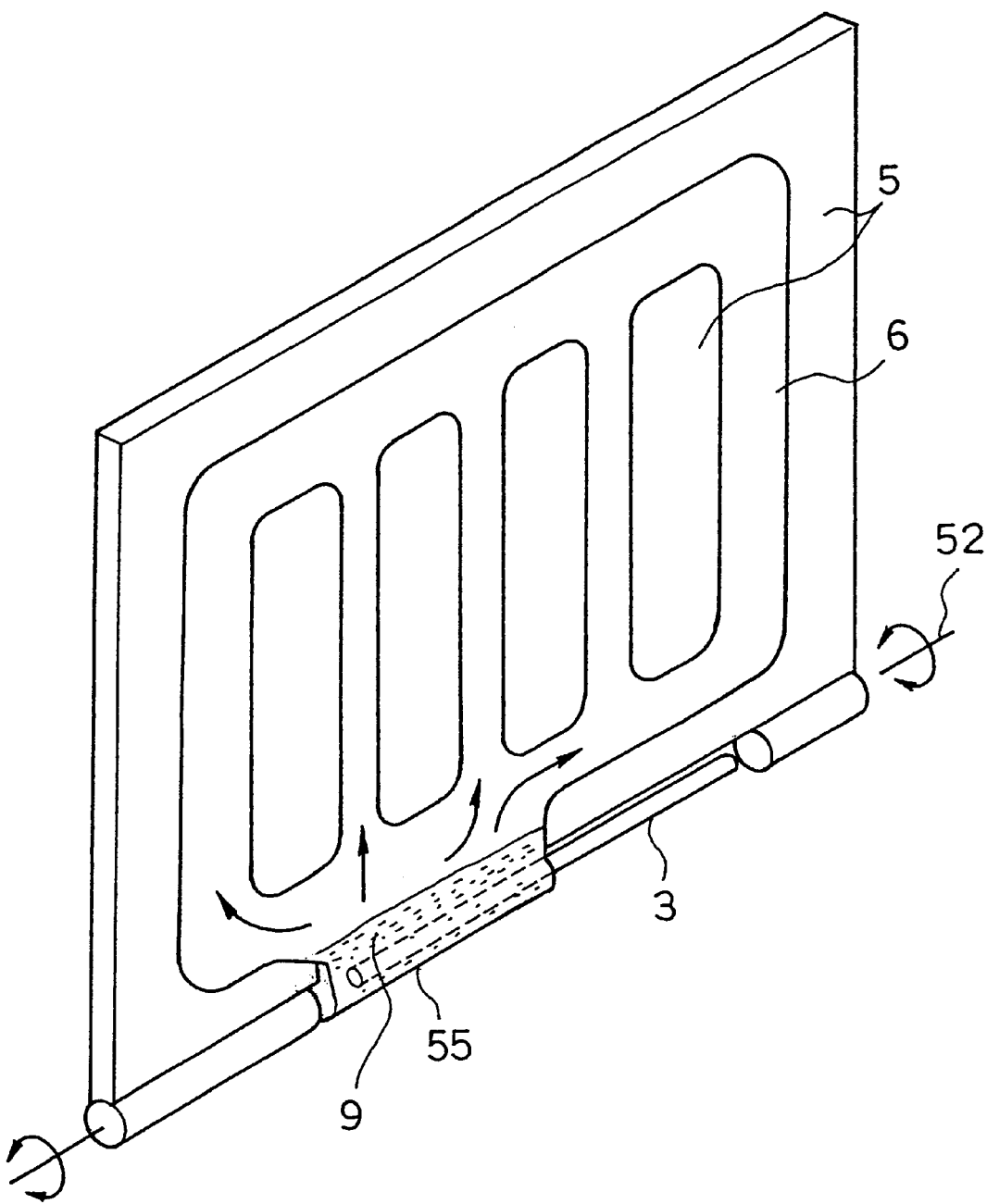
FIG. 30 illustrates a side view of one of the embodiments of the present invention.
Figure 31:
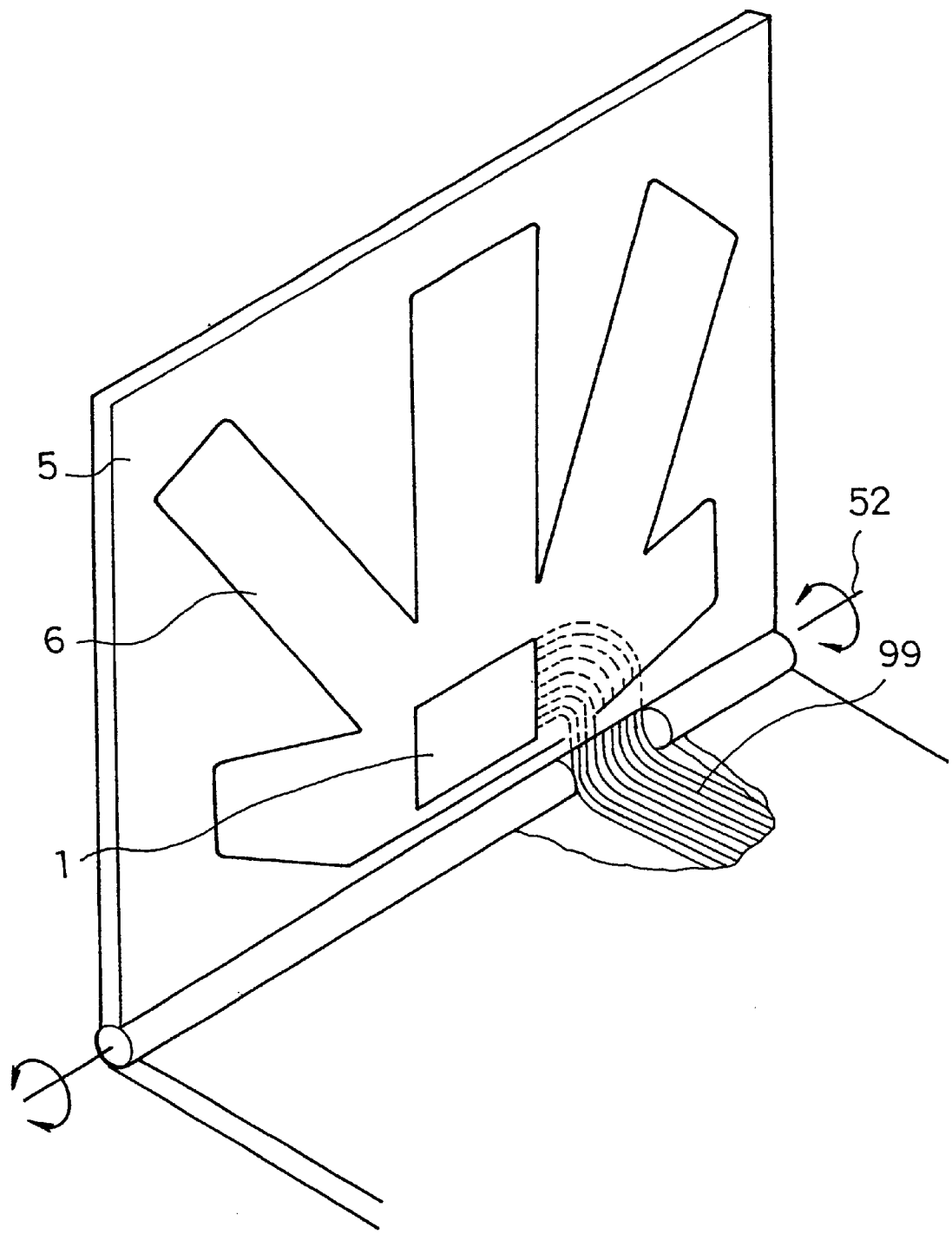
FIG. 31 illustrates a side view of one of the embodiments of the present invention.

A straight heat pipe may be used as illustrated in FIG. 30. In the drawing of FIG. 30, the liquid reservoir 55 is installed at the connecting axis 52.

Alternatively, the CPU 1 may be installed at the lid, and the CPU 1 may be cooled directly using the thermo-siphon 6. The CPU 1 is connected to the main body by cables 99. The heat spreading efficiency improves due to a direct cooling. Instead of the heat pipe, a metal rod having high thermal conductivity or a carbon material which also has high thermal conductivity may be used. Similar effects as in the heat pipe are obtained by using the metal rod and the carbon material having high thermal conductivity.

The invention can be applied not only to the notebook type personal computer but also can be applied to others such as hand-held information processing apparatus, mobile telephone and mobile facsimile machine.

According to embodiment 2 of the present invention, since the one end of a heat pipe is inserted to the thermo-siphon and because a second working fluid is circulating in the heat pipe, so that the heat generated from the heat generating unit circulates in the heat pipe, the heat is transferred from the one end to an other end of the heat pipe, and the heat is effectively conducted through to the working fluid inside the thermo-siphon. Likewise, a first working fluid is circulating in the thermo-siphon in a plane direction of the heat spreading board. Such that the temperature profile at various positions of the heat spreading board is equalized. As a result of this, the heat generated at the heat generating unit is dissipated throughout the heat spreading board by circulation of the first and the second working fluids, which can effectively use all of its board in releasing the heat to outside.

According to embodiment 2 of the present invention, since a heat pipe is inserted to the liquid reservoir of the thermo-siphon, the second working fluid vaporized by the heat generated at the heat generating unit indirectly touches the first working fluid collected in the liquid reservoir of the thermo-siphon. Due to this, heat from the second working fluid is effectively transferred to the first working fluid, and the first working fluid turns into vapor by vaporization. The vaporized first working fluid spreads inside the thermo-siphon, and are condensed at low-temperature parts and release heat from a whole plane of the heat spreading board to outside. A condensed first working fluid which is cooled by the heat spreading will return and collected to the lower liquid reservoir by the gravity. At the liquid reservoir, the heat of the second working fluid is conducted, then the first working fluid will vaporize again, and spreads inside the thermo-siphon. Accordingly, by inserting the heat pipe to the liquid reservoir of the thermo-siphon, the heat is effectively transferred from the second working fluid to the first working fluid, to improve the effect of heat spreading.

According to embodiment 2 of the present invention, since the insertion of a heat pipe extends along the direction of the connecting axis of the main body and the lid, even when the first working fluid inside the liquid reservoir leans to a side from the main body being used in the inclined position, at least one part of the heat pipe extending in the direction of the connecting axis will be immersed in the working fluid. As a result of this, decrease in the heat conduction from the second working fluid to the first working fluid and decrease in a boiling efficiency are prevented, and boiling without liquid is effectively prevented as well.

According to embodiment 2 of the present invention, since a thermally conductive block is installed at the heat generating unit, and since a heat pipe is inserted at the hinge which is installed to the thermally conductive block, the heat generated at the heat generating unit is efficiently transferred to the heat pipe via the conductive block. Due to this, even if there is no space available inside the main body to let go of the heat, accompanying the thinning of the main body, the heat generated at the heat generating unit is easily released to outside via the thermally conductive block.

Embodiment 3.

Hereinbelow, embodiment 3 of the mobile information processing apparatus for the present invention is described with reference to the attached drawings.

Figure 32:
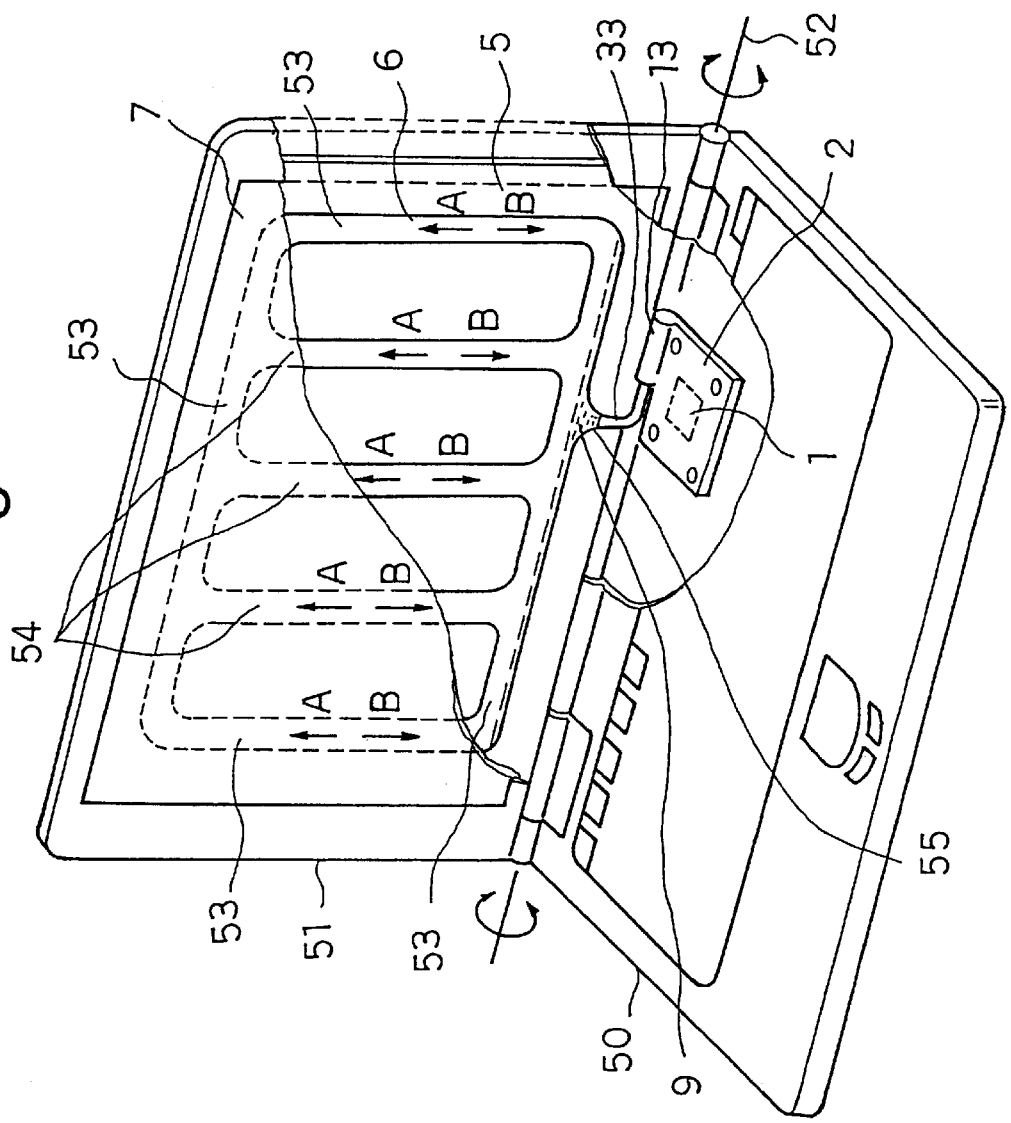
FIG. 32 illustrates a side view of one of the embodiment of the present invention.

FIG. 32 is the side view of one of the examples of embodiment 3 of the present invention. Hereinbelow, mostly on the points of difference to note from FIG. 1 is described. In addition to the numbered components indicated in FIG. 1, FIG. 32 includes the following components: a circulation pipe 33 attached to the thermo-siphon, a heat spreading board 5, and a thermo-siphon 6 formed on the heat spreading board 5. The thermo-siphon 6 includes the vapor flow channels 53 and 54 which circulate the working fluid 9 in the plane direction of the heat spreading board.

Figure 33:
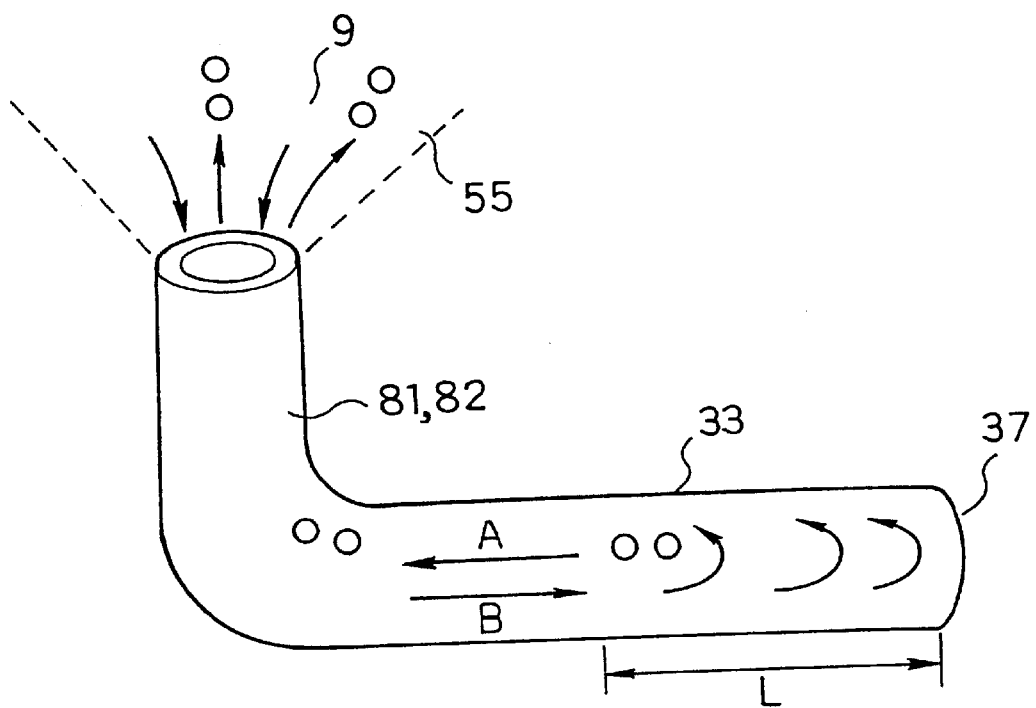
FIG. 33 illustrates a circulation pipe of one of the embodiment of the present invention.

FIG. 33 illustrates configuration of a circulation pipe 33. In the drawing, a component numbered 37 is a closed end of the circulation pipe 33. Also in the drawing, region marked by "L" is an area on the circulation pipe 33 to be inserted to the hinge 13 of the thermo-siphon 6, where the working fluid is vaporized.

The heat generated at the CPU 1 is transferred to the circulation pipe 33 via the hinge 13 of the thermally conductive block 2, and heats the working fluid 9. The working fluid heated is transferred in a direction A as a vapor. The vapor moves inside the thermo-siphon. While moving inside the thermo-siphon the vapor condenses and liquefies to flow back in a direction B of the circulation pipe. By repeating this cycle, the heat from the CPU is efficiently dissipated and spreads throughout the heat spreading board 5. For the configuration of heat pipe illustrated in FIG. 33, there is a danger of not being able to circulate the working fluid due to the vapor flow and the returning fluid flow interference (hereinafter referred to as a flooding limit) in the circulation pipe 33.

For the configuration illustrated in FIG. 33, in order for the vapor flow and the returning fluid flow to go back and forth inside a same pipe, a liquid-vapor separation is important. A technical topic lies in a structure of connecting-and-sealing of the circulation pipe 33 to the thermo-siphon 6, and the circulation pipe diameter so that the flooding will not occur when implementing the two-phase heat flow transfer cycle. The pipe diameter illustrated in FIG. 34 can be calculated from Tien's equation and Imura's equation stated below.

Tien's equation:

$$Q_{max}(W) = Ck^2 * Ax * L * ((g * \sigma * (\rho l - \rho v)^{(1/4)}) / ((\rho l^{(-1/4)} + \rho v^{(-1/4)}))^2)$$

Imura's equation:

$$Q_{max}(W) = L * (\sigma * g * \rho v^2 * (\rho l - \rho v))^{0.25} * \phi * \pi * Di * le$$

whereas $Ck = \sqrt{3.2} * \tanh(0.5 * Bo^{1/4})$

Bond's number $Bo = Di * (g(\rho l - \rho v)/\sigma)^{1/2}$

Kutateladze's number $\phi = 0.16 * (1 - \exp(-(Di/le) * (\rho l / \rho v)^{0.13}))$ Provided that pipe diameter: Di (m)

cross sectional area of the pipe: Ax (m$^2$)

length L of heating area: le (m)

surface tension: $\sigma$(N/m)

vapor latent heat: L (J/kg)

vapor density: $\rho v$ (kg/m$^3$)

liquid density: $\rho l$ (kg/m$^3$)

gravitational acceleration: g

The equations assume that the working fluid is R-134a.

Figure 34:
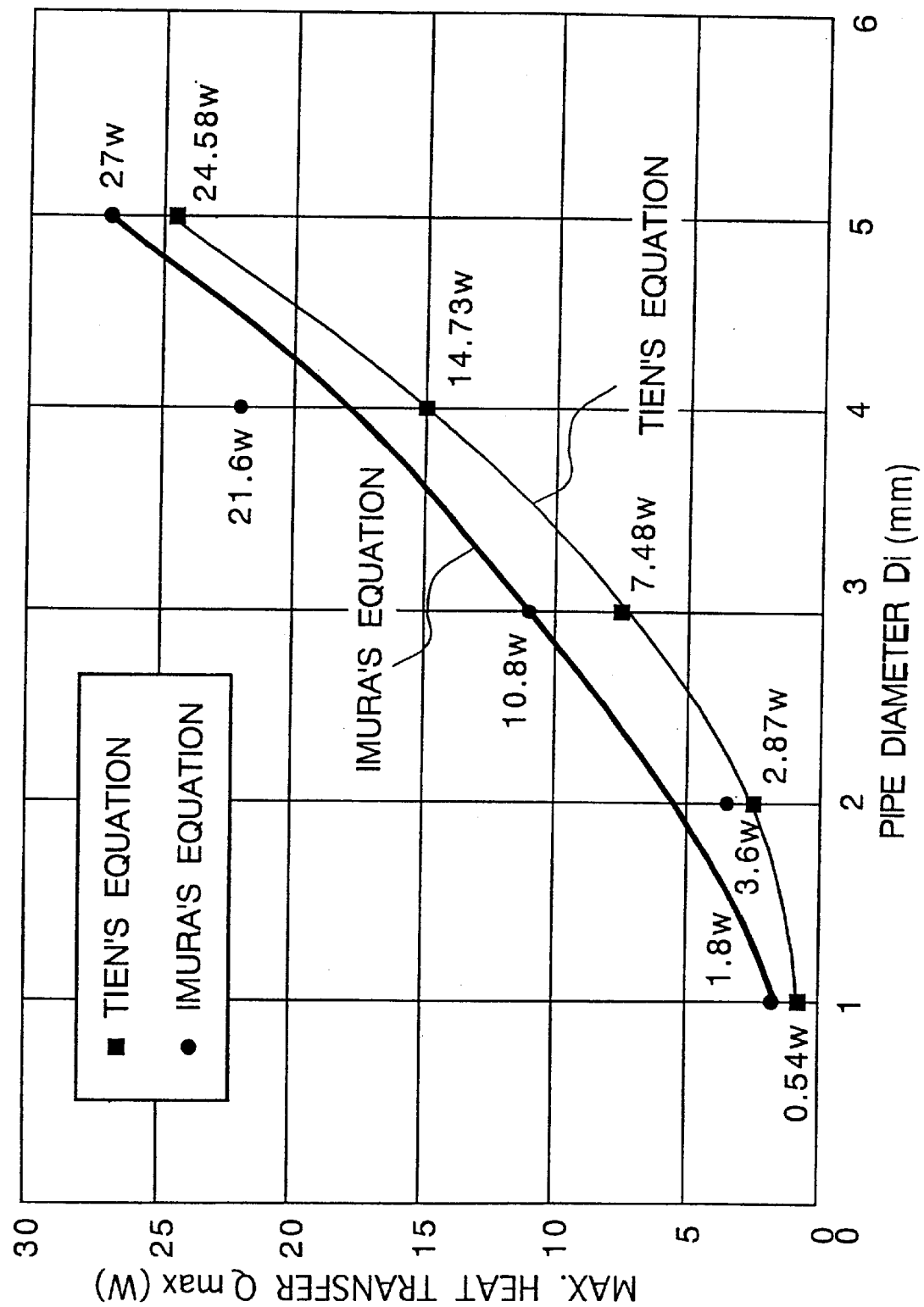
FIG. 34 is a graph showing relationship of a circulation pipe diameter and amount of heat transfer for one of the embodiment of the present invention.

From the FIG. 34, in order to maintain the maximum amount of heat transfer Qmax=10W, an inner pipe diameter of approximately 3 to 3.4 mm is required.

Figure 35:
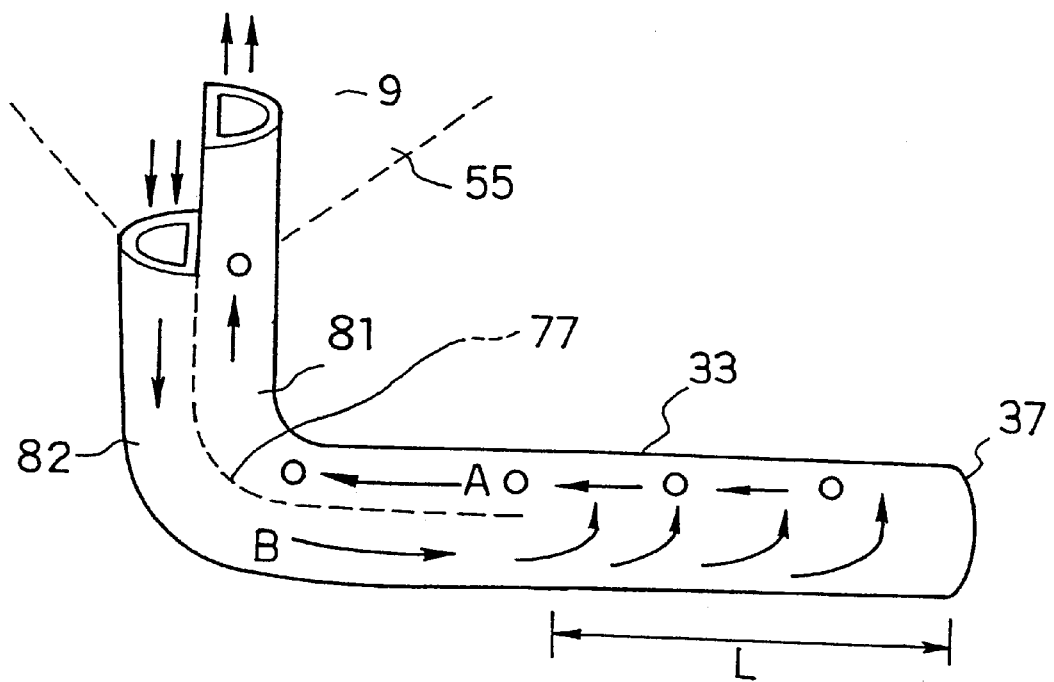
FIG. 35 illustrates a circulation pipe of one of the embodiment of the present invention.

FIG. 35 illustrates a configuration of the circulation pipe 33 having a partition wall 77. For the configuration of heat pipe illustrated in FIG. 33, there is a case of not being able to circulate the working fluid due to the flooding limit in the circulation pipe 33. However, in the present configuration, the inner circulation pipe channel is divided into more than two parts, and a vapor flow channel 81 and a liquid flow back channel 82 are separate, so that there will be no flooding limit, preventing the returning fluid blown away by the vapor. Under this configuration, the working fluid circulation is highly reliable and the heat transfer limit will be large.

Also, by making a height of the vapor flow channel 81 higher than a height of the liquid flow back channel 82, it becomes difficult for the working fluid to enter the vapor flow channel 81.

Figure 36:
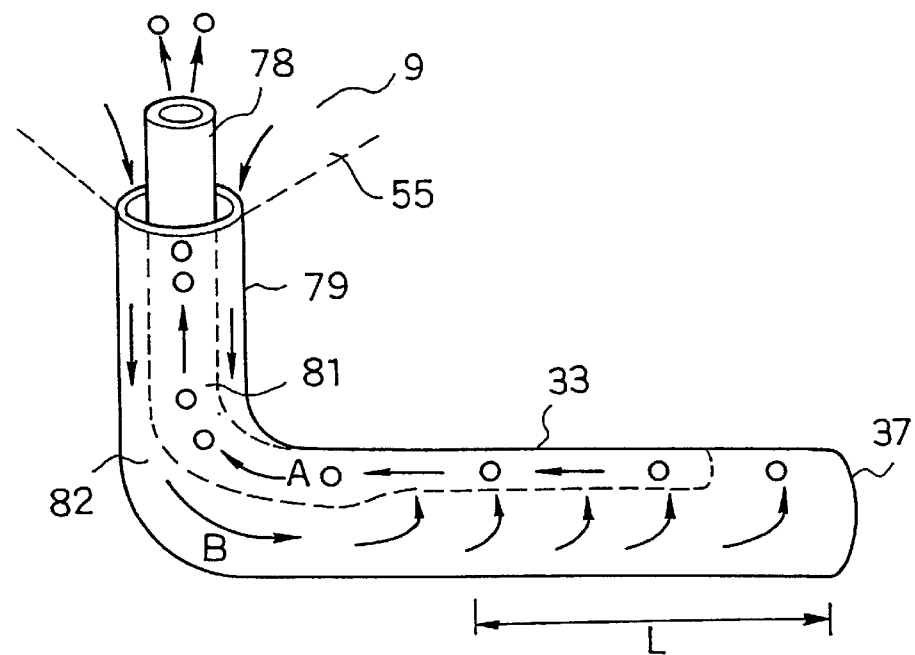
FIG. 36 illustrates a circulation pipe of one of embodiment of the present invention.

FIG. 36 illustrates a configuration of artery type circulation pipe 33. In the drawing of FIG. 36, a circulation pipe includes an inner pipe 78 which is installed inside the circulation pipe 33, and an outer pipe 79. In the present configuration, the circulation pipe is divided into more than two pipes, i.e., the vapor flow channel 81 and the liquid flow back channel 82 are formed separately in the pipe, therefore, there will be no flooding limit where the returning fluid is blown away by the vapor. Under this configuration, the working fluid circulation is highly reliable and the heat transfer limit will be high. Likewise, by making a height of the vapor flow channel 81 higher than a-height of the liquid flow back channel 82, it becomes difficult for the working fluid to enter the vapor flow channel 81, as illustrated in FIG. 35.

Figure 37:
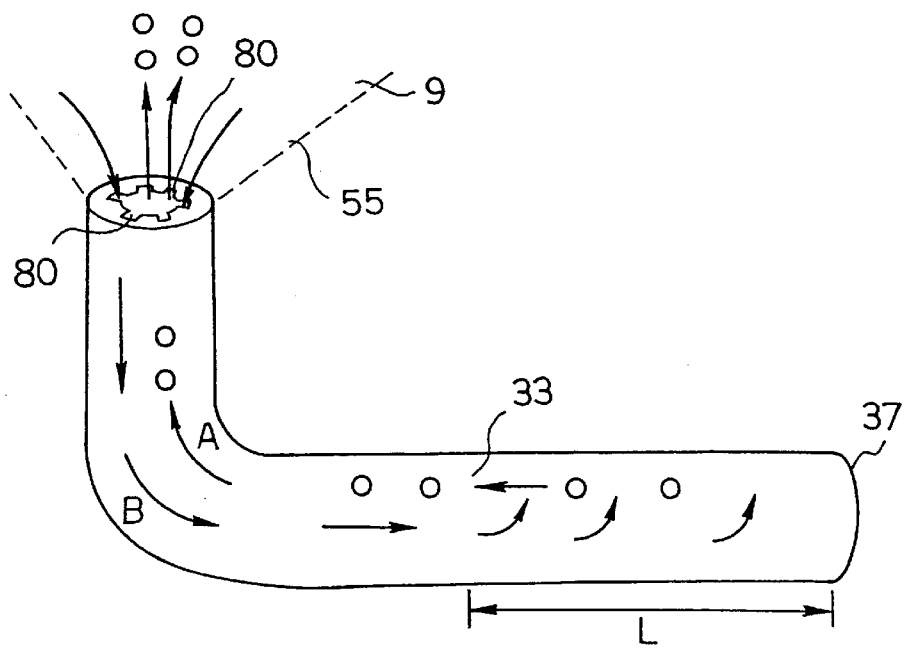
FIG. 37 illustrates a circulation pipe of one of embodiment of the present invention.

FIG. 37 illustrates a configuration of groove-type circulation pipe 33. In the drawing of FIG. 37, the groove-type circulation pipe 33 installs grooves 80. In the present configuration, because the grooves 80 are formed at an inner wall of the circulation pipe 33, the returning fluid will flow through the grooves due to the surface tension, this way the vapor flow channel and the liquid flow back channel are separated. Under this configuration, the working fluid circulation is highly reliable and the heat transfer limit will be high.

Figure 38:
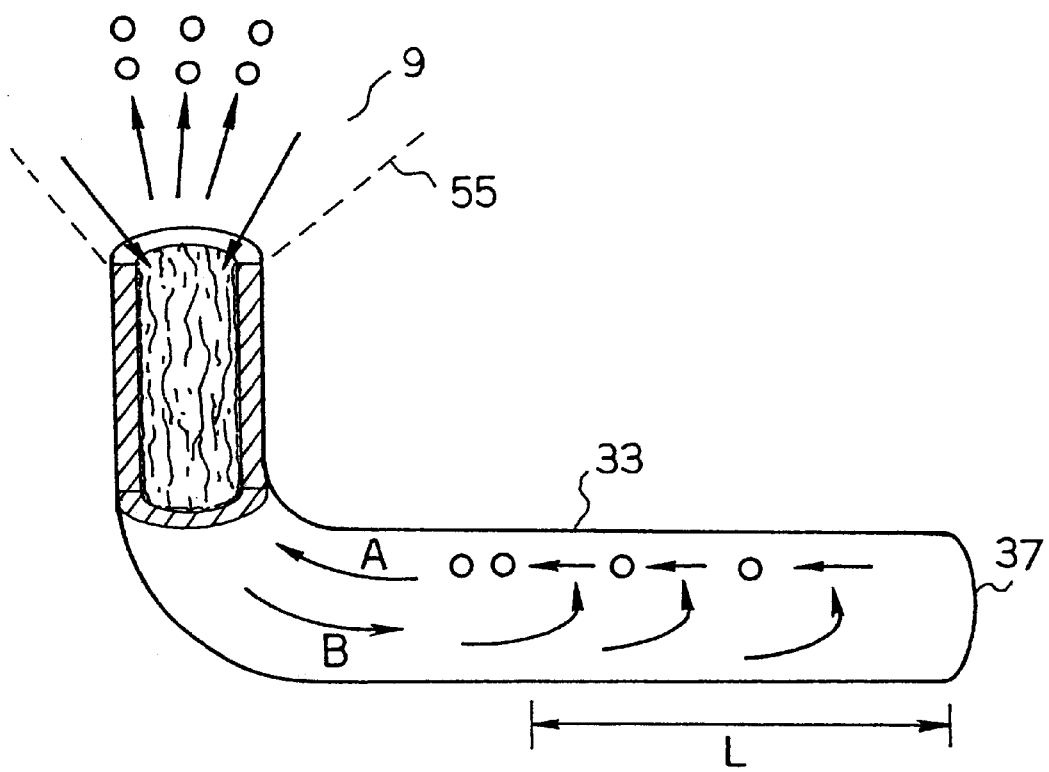
FIG. 38 illustrates a circulation pipe of one of embodiment of the present invention.

Also, as illustrated in FIG. 38, wick 56 may be provided at the inner wall of the circulation pipe. The returning liquid flows through the wick 56 by the capillary force of the wick, therefore, the vapor flow channel and the liquid flow back channel are separated.

Figure 39A:
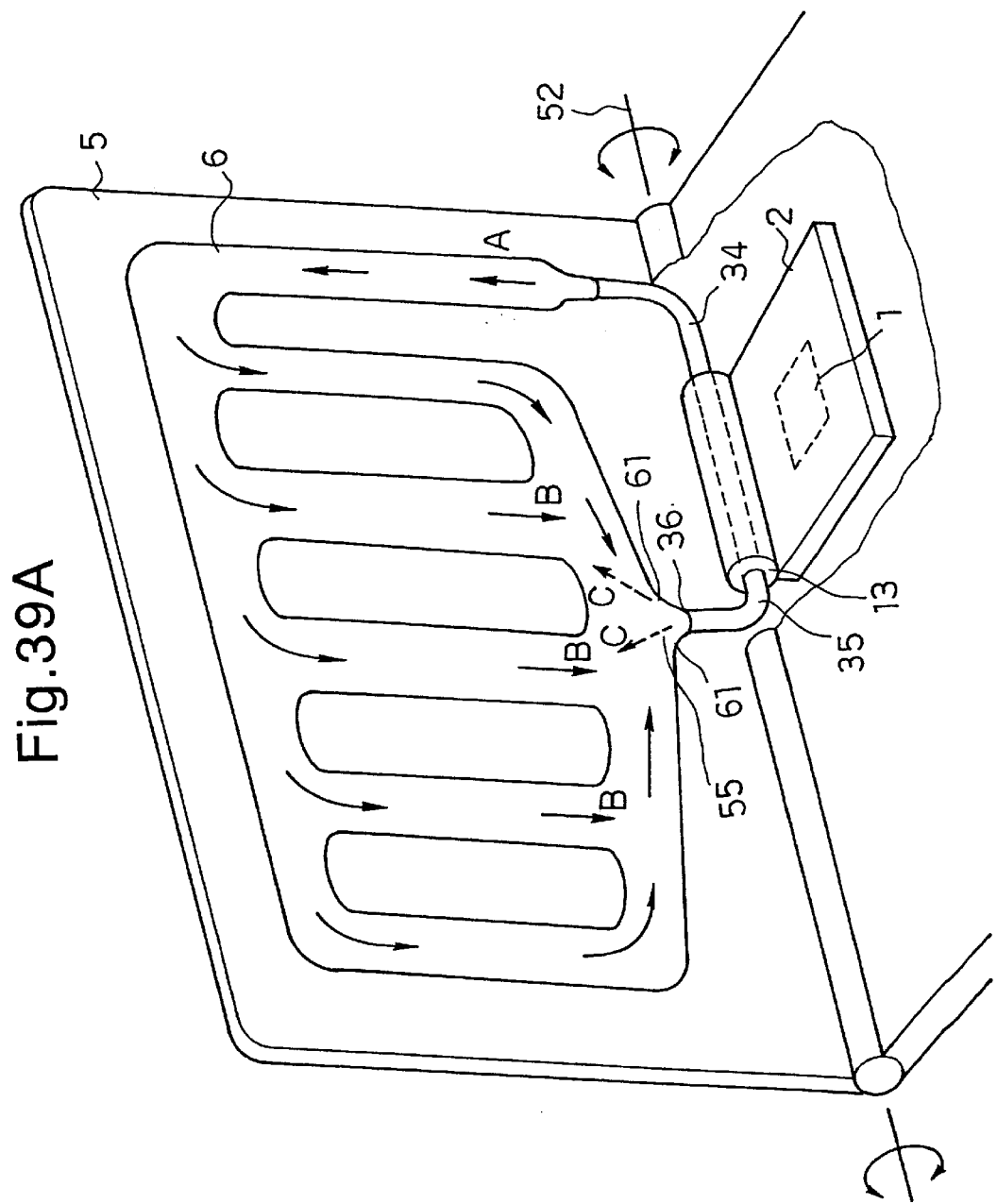
FIG. 39A illustrates a side view of one of embodiment of the present invention.

A heat transfer loop illustrated in FIG. 39A includes a vapor pipe 34 for sending the working fluid 9 vaporized by the heat generated at the CPU 1 to the thermo-siphon 6, and a liquid flow back pipe 35 for returning the condensed and liquefied working fluid at the thermo-siphon 6. The vapor pipe 34 and the fluid flow back pipe 35 are separately installed. Due to this, the vapor flow channel 81 and the liquid flow back channel 82 are separate, and there will be no flooding limit arising from the returning fluid blown away by the vapor. Under this configuration, the working fluid circulation is highly reliable and the heat transfer limit will be large. The vapor pipe 34 can be made from a single circulation pipe. A middle of the circulation pipe is made to pass the hinge 13. To begin with, the vapor occurs both at the vapor pipe 34 and the liquid flow back pipe 35 in the directions A and C. Because the liquid flow backpipe includes five channels, an amount of returning liquid will eventually be more for the five channels than one channel of the vapor pipe 34, as a result of this the working fluid 9 will be collected at the liquid reservoir 55, and the working fluid 9 will circulate in the directions A and B.

A pattern of the thermo-siphon must take into account the returning fluid by the gravity. A connecting part 36 which is a junction between the thermo-siphon and the liquid flow back pipe 35 is inclined so that the connecting part 36 comes immediately below the pattern. This way, the liquid flow back will definitely occur irrespective of an angle of the liquid crystal display panel in use. A taper 61 is installed at the junction between the connecting part 36 and the liquid flow back pipe. The operation of liquid collection and circulation will further be stabilized by making the shape of the connecting part 36 a bell mouth shape.

Figure 39B:
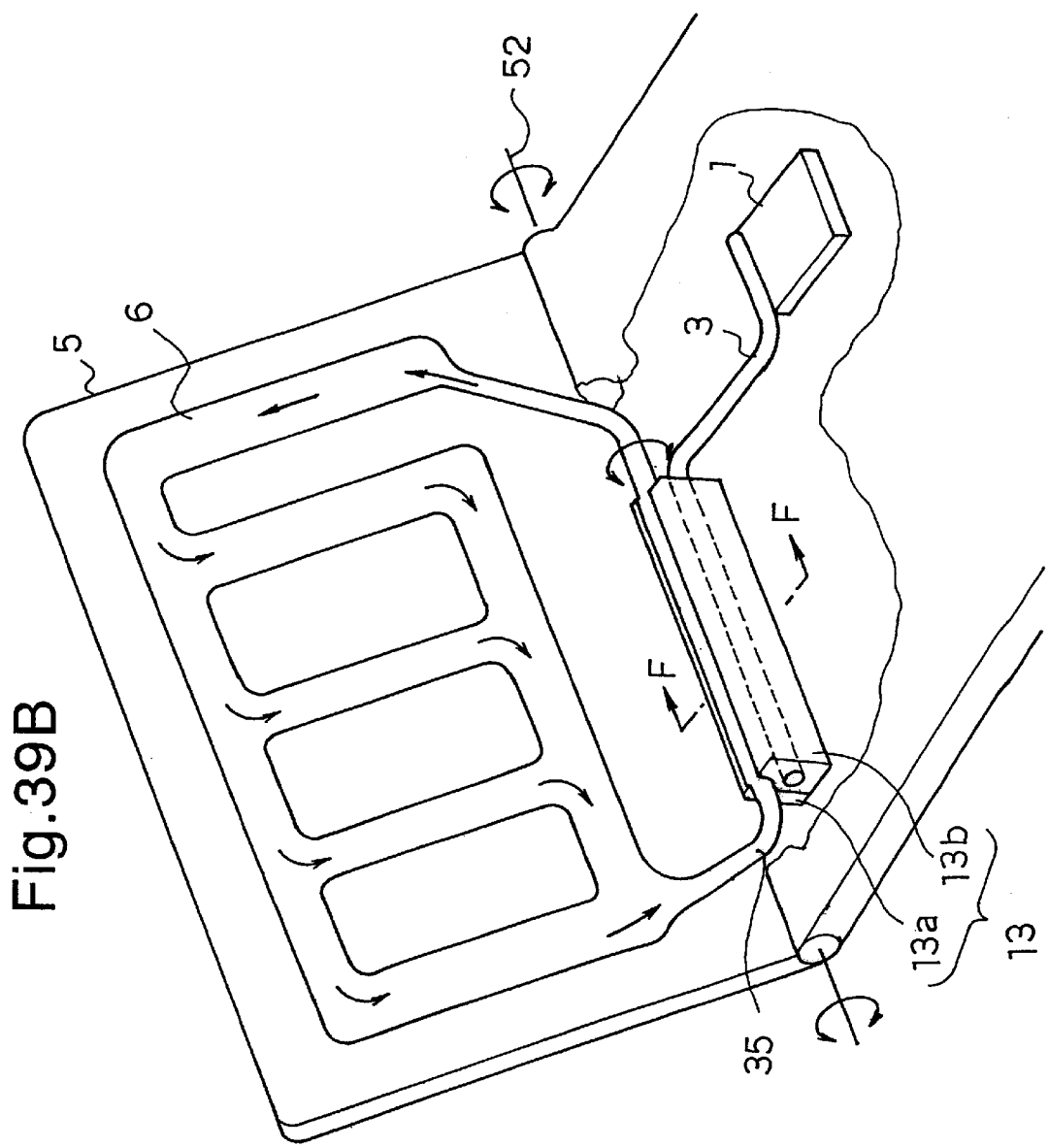
FIG. 39B illustrates a side view of one of embodiment of the present invention.
Figure 39C:
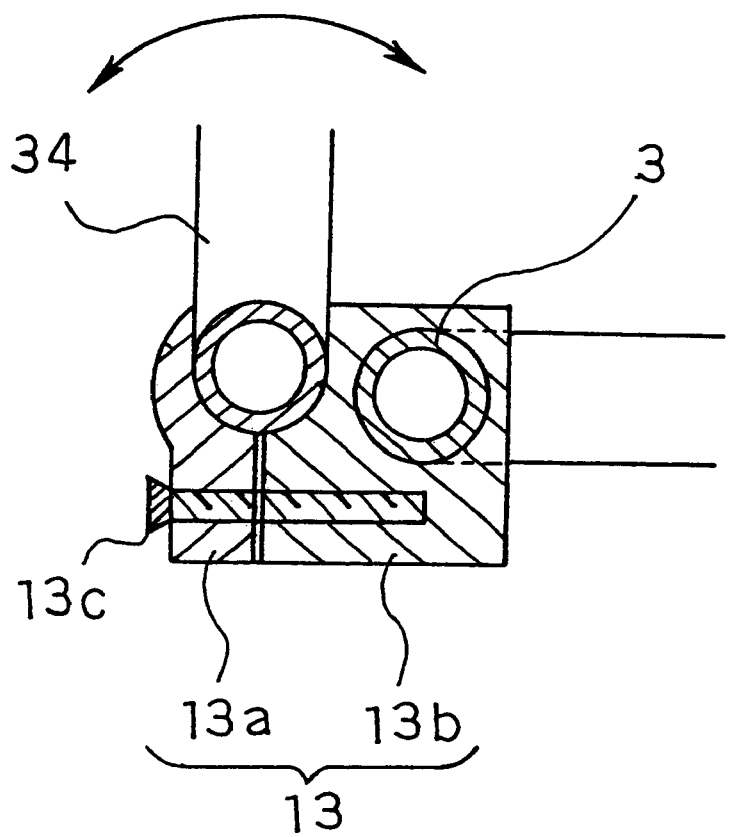
FIG. 39C illustrates a cross-sectional diagram F—F of FIG. 39B.

A drawing of FIG. 39B illustrates a configuration of FIG. 39A with the heat pipe 3 installed. A drawing of FIG. 39C is the cross-sectional diagram F—F of a hinge 13 of FIG. 39B. The hinge 13 includes a hinge block 13a and a heat block 13b, which are fastened together by a screw 13C. In between the hinge block 13a and the heat block 13b, the heat pipes 34 and 35 are installed so that they can rotate. The heat pipe 3 is inserted to the heat block 13b.

Another example is described with reference to FIG. 40.

Figure 40:
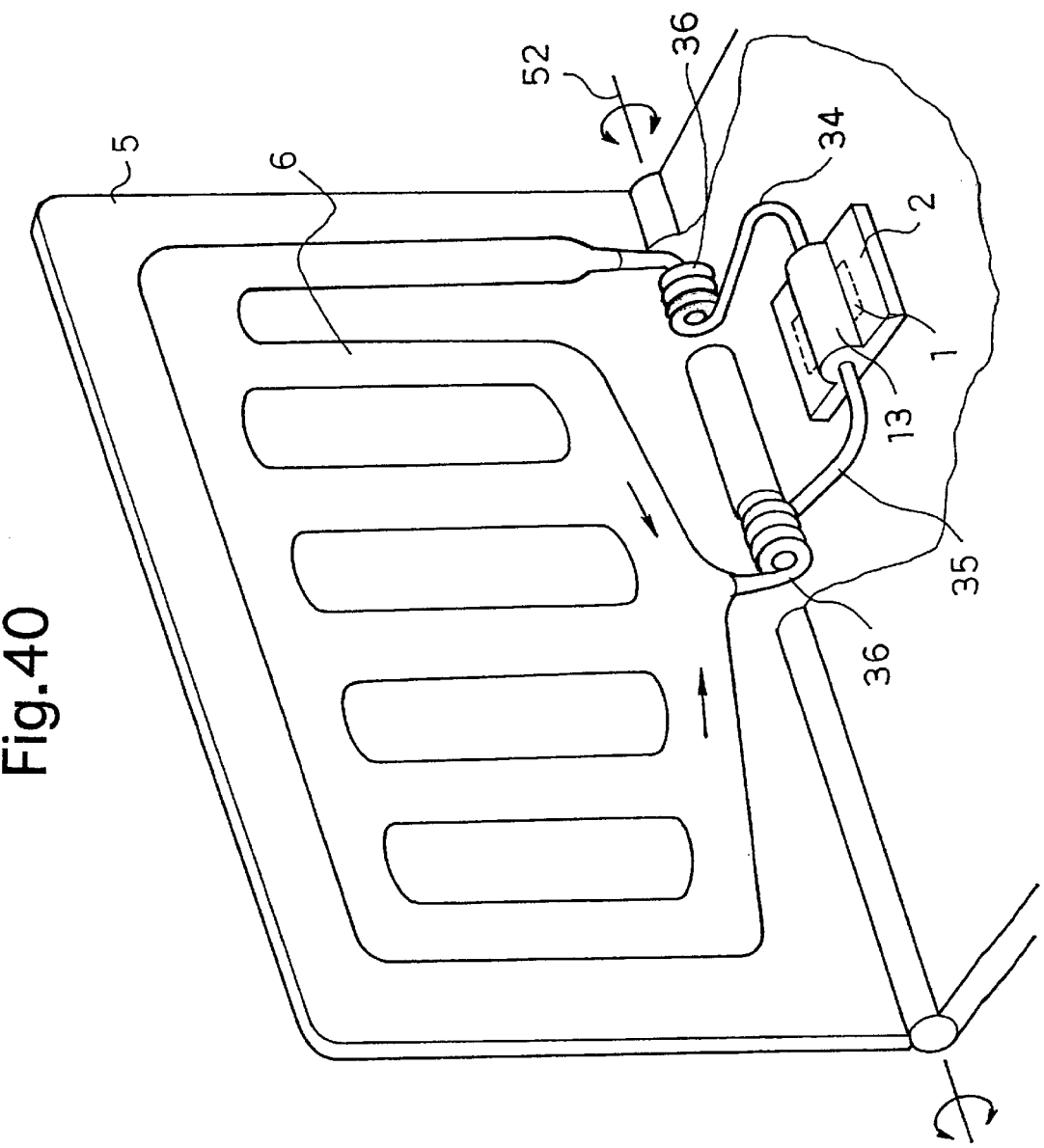
FIG. 40 illustrates a side view of one of embodiment of the present invention.

FIG. 40 illustrates a heat transfer loop of another embodiment of heat spreading configuration. The vapor pipe 34 and the liquid flow backpipe 35 forming the circulation pipe is being coiled along the connecting axis 52 between the main body and the lid. A center axis of the coil 36 is same as the connecting axis 52. Accordingly, change in a length of the pipe which accompanies opening and closing of the liquid crystal display panel is absorbed by the coil 36. Under this configuration, a degree of freedom in setting a position of placing the CPU 1 increases. Also, the hinge 13 does not require to be on the connecting axis 52, such that a degree of freedom in setting a position of the hinge 13 also increases. The hinge 13 does not need to have a hinge function any more for a case of FIG. 40. It is just a tightly fixed connection of circulation pipe and thermally conductive block 2. In FIG. 40, the hinge 13 is placed immediately above the CPU 1, and this improves the thermal conductivity.

Figure 41:
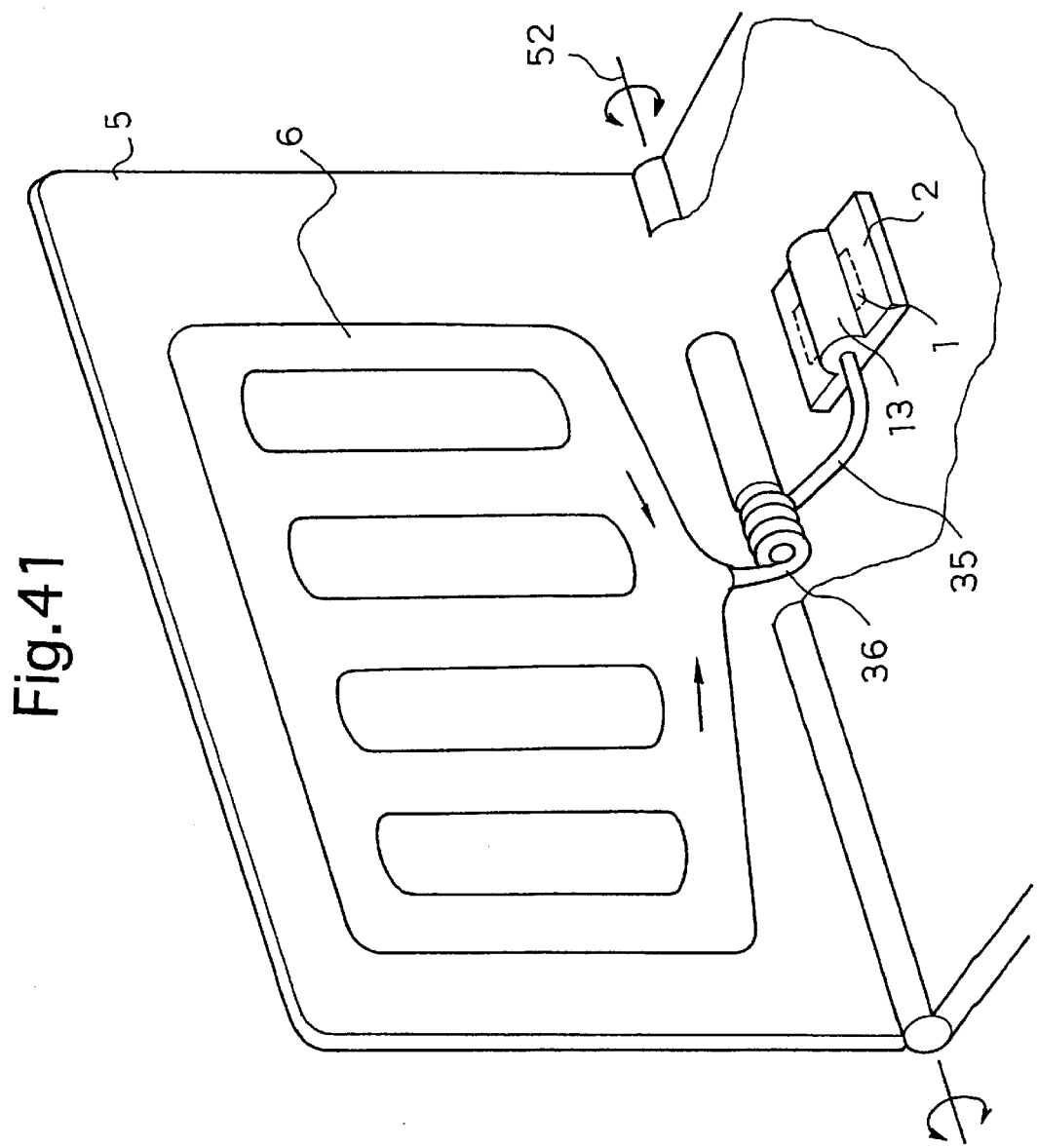
FIG. 41 illustrates a side view of one of embodiment of the present invention.

As in FIG. 41, the coil 36 can be installed to the configuration of FIG. 32.

Figure 42:
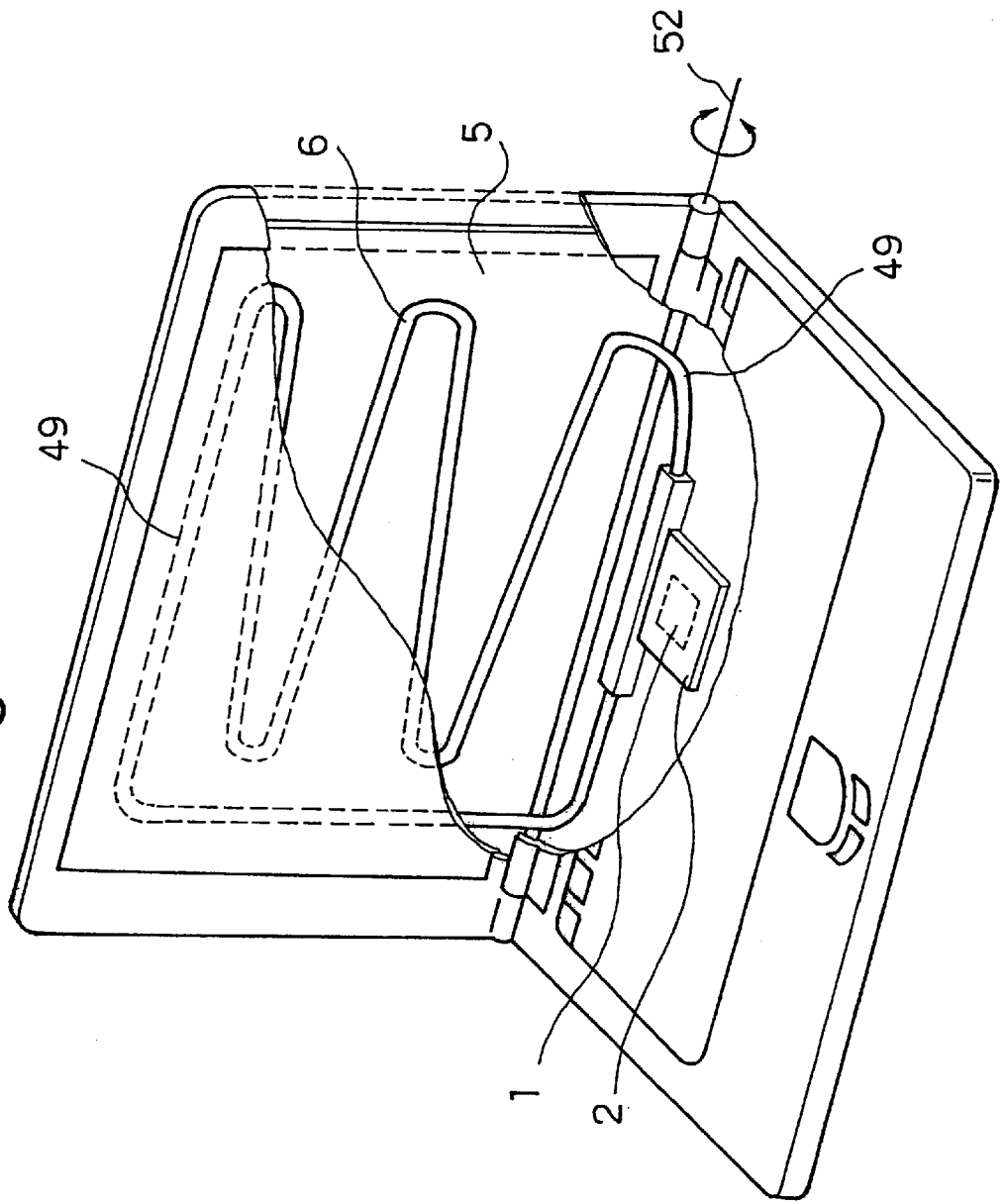
FIG. 42 illustrates a side view of one of embodiment of the present invention.
Figure 43:
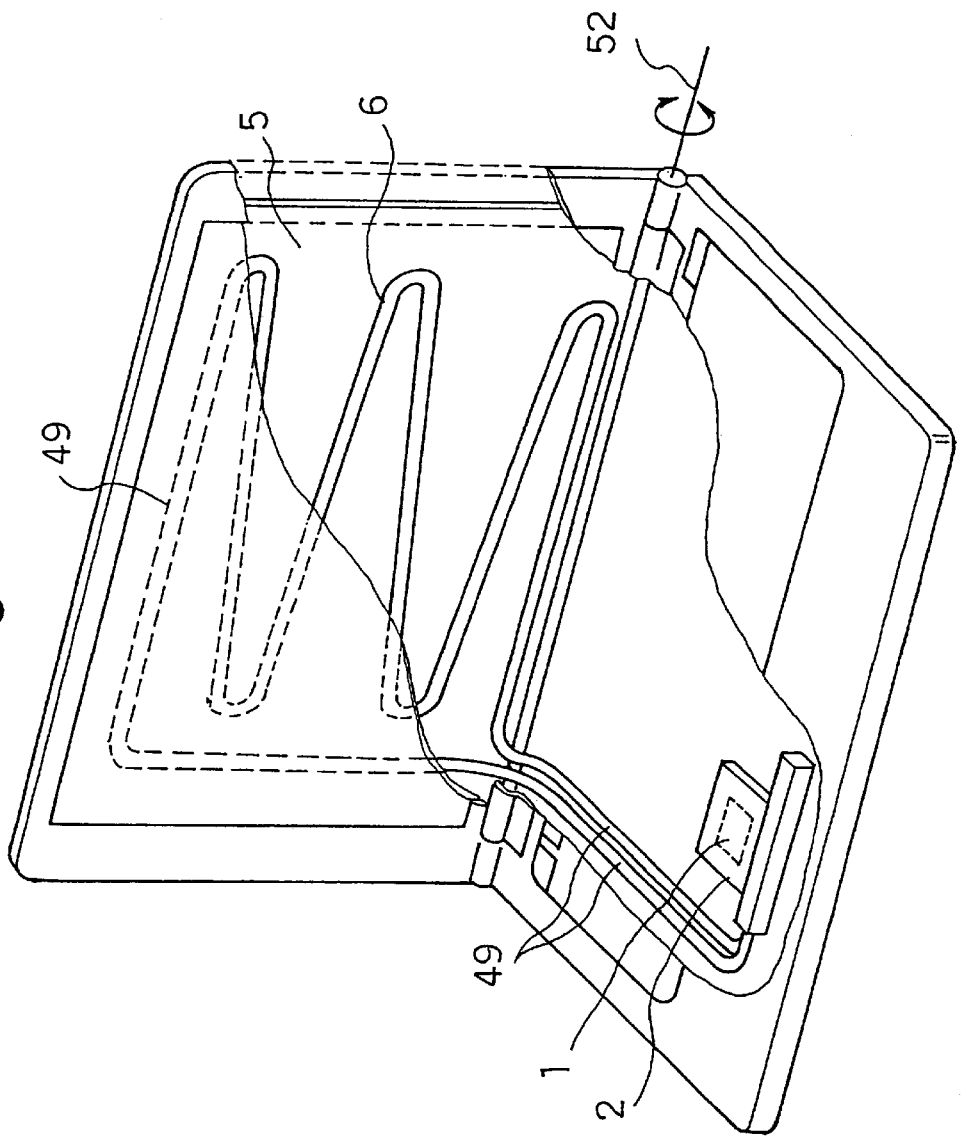
FIG. 43 illustrates a side view of one of embodiment of the present invention.
Figure 44:
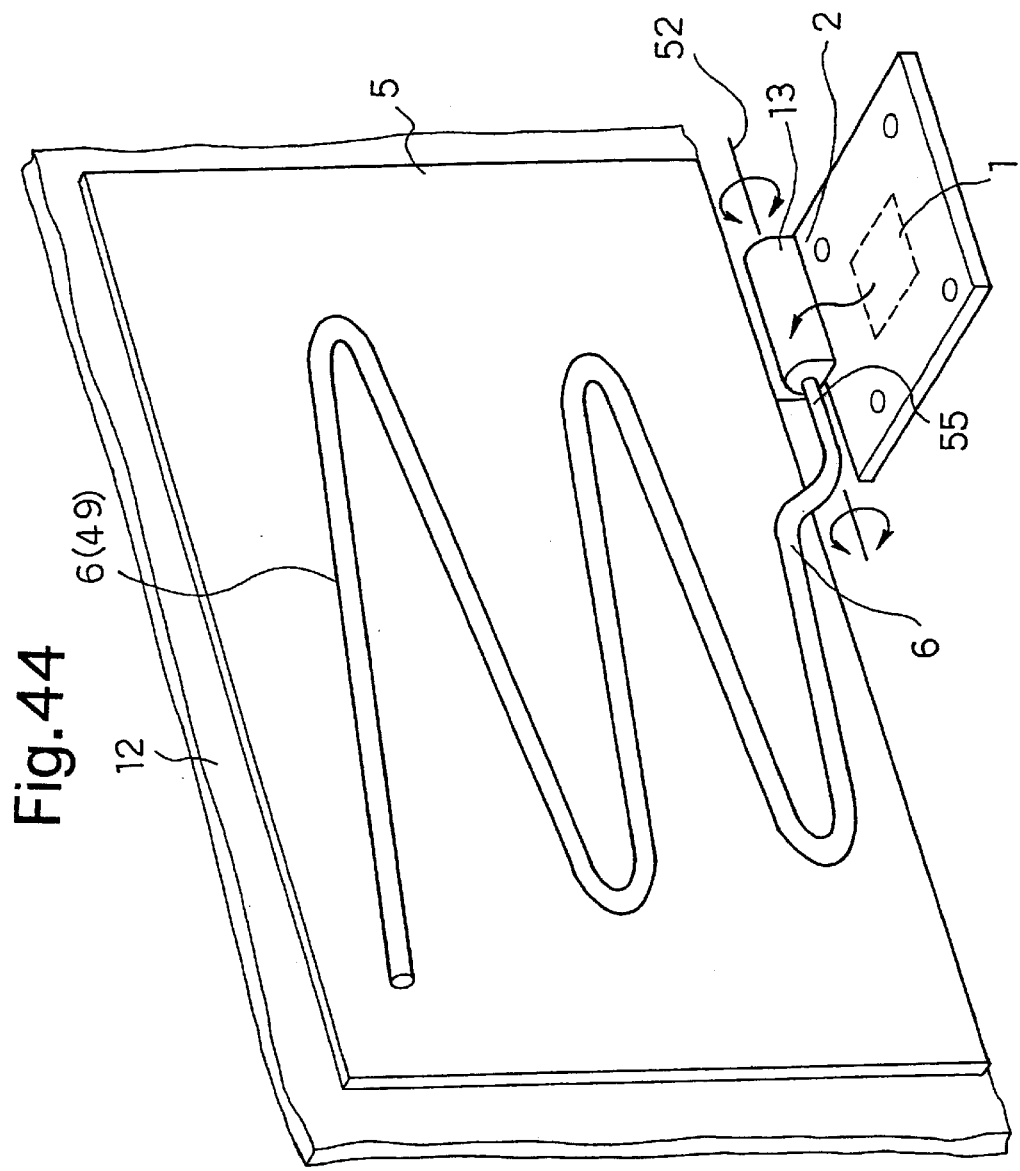
FIG. 44 illustrates a side view of one of embodiment of the present invention.
Figure 45A:
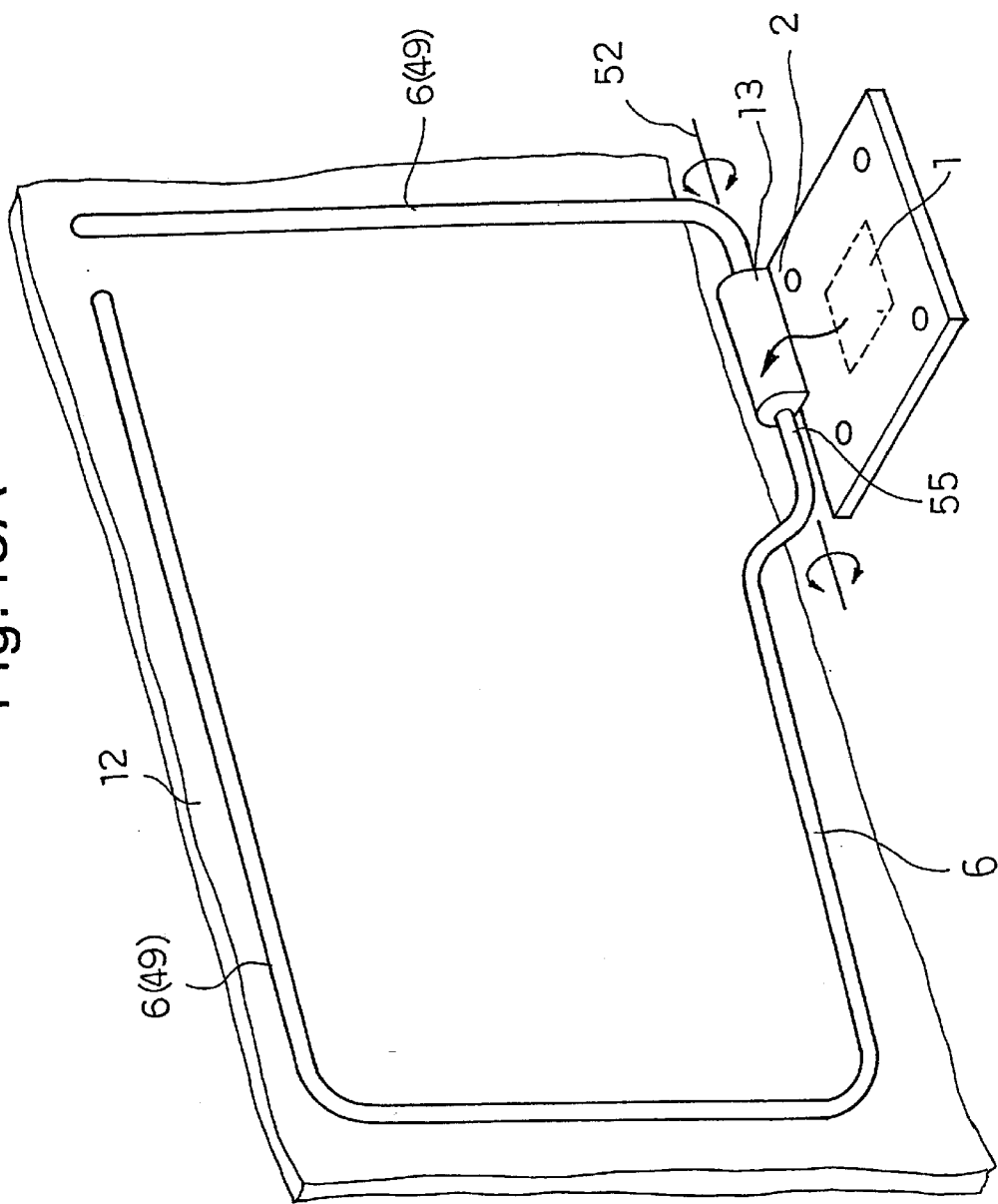
FIG. 45A illustrates a side view of one of embodiment of the present invention.
Figure 45B:
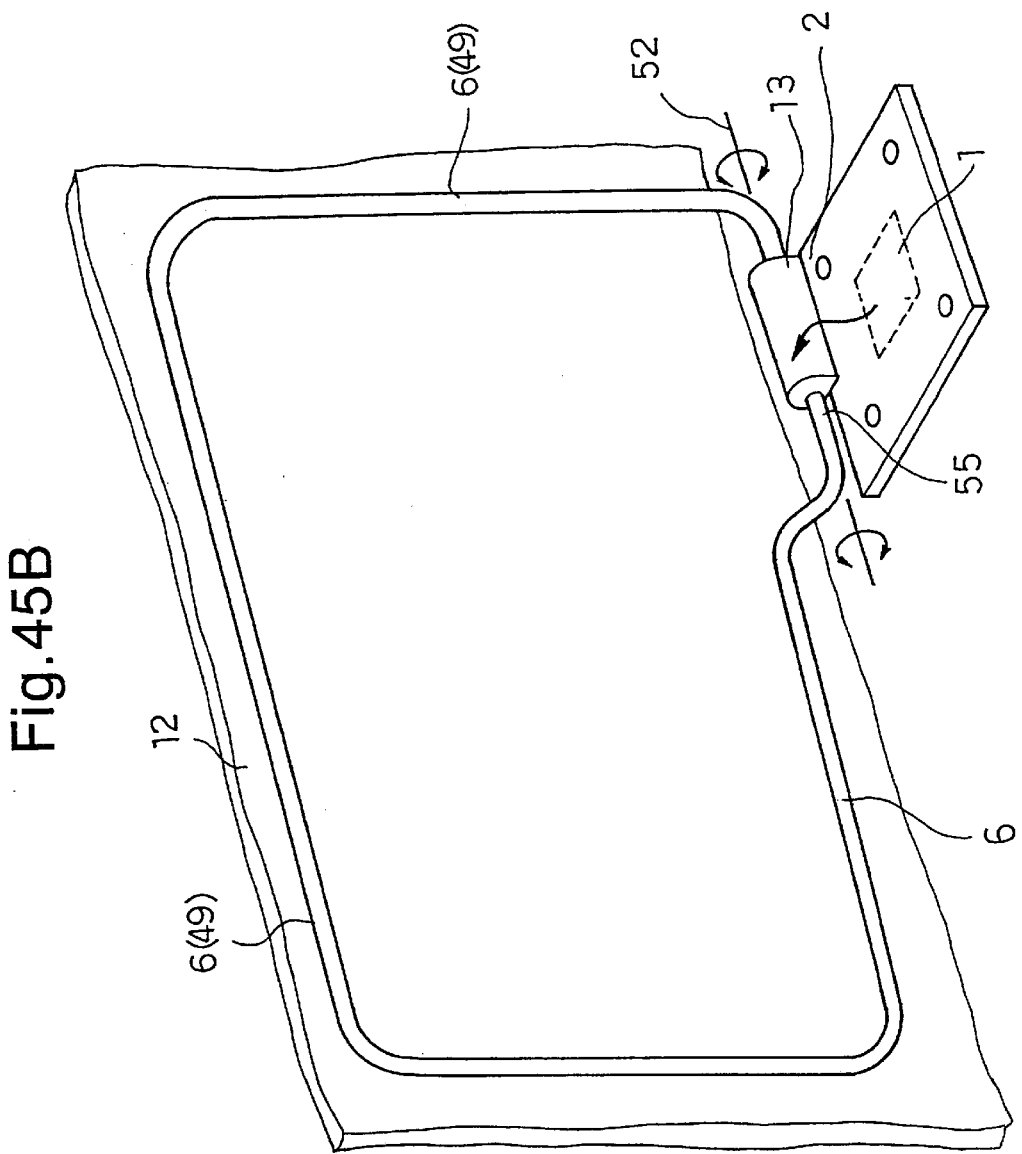
FIG. 45B illustrates a side view of one of embodiment of the present invention.

As illustrated in FIGS. 42, 43 and 45B, the thermo-siphon 6 can have a loop pattern. Also, the thermo-siphon 6 does not have to be looping, as illustrated in FIGS. 44 and 45A. For those cases illustrated in FIGS. 42 to 45B, the working fluid is circulated using the gravity. That is, these cases has no liquid reservoir at the lid but it is present on the main body. The liquid reservoir on the main body has an inclined pattern so that the working fluid will always be collected at the main body. A whole of the thermo-siphon 6 in FIGS. 42 to 45B is made from the pipe 49. To allow for opening and closing of the lid, a whole part of the pipe 49 in FIGS. 42 and 43 is made flexible, or only a part near the connecting axis 52 can be made flexible.

For the cases illustrated in FIGS. 44, 45A and 45B, the hinge 13 is installed, therefore, there is no need to make the pipe 49 of the thermo-siphon 6 flexible.

Figure 46:
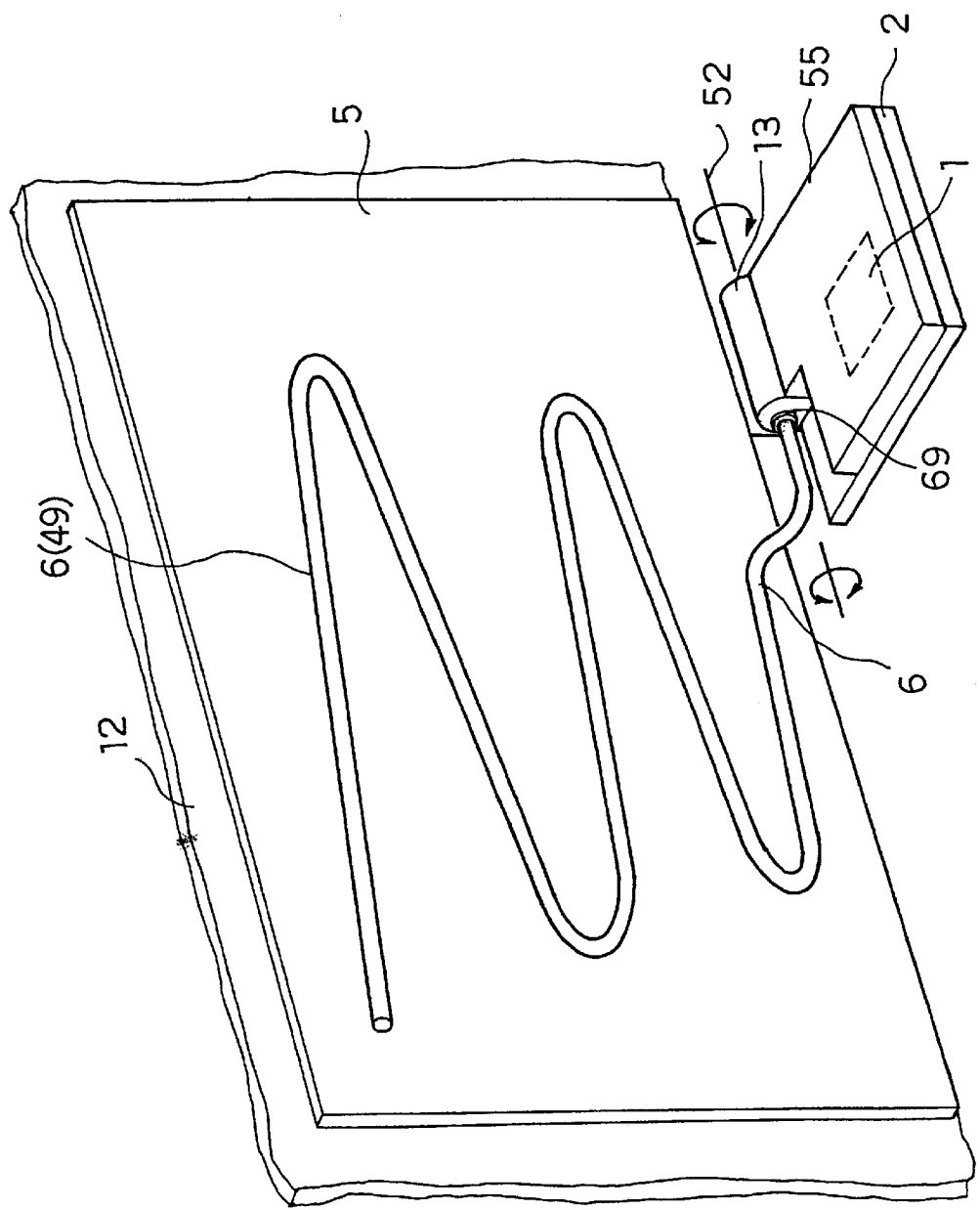
FIG. 46 illustrates a side view of one of embodiment of the present invention.
Figure 47:
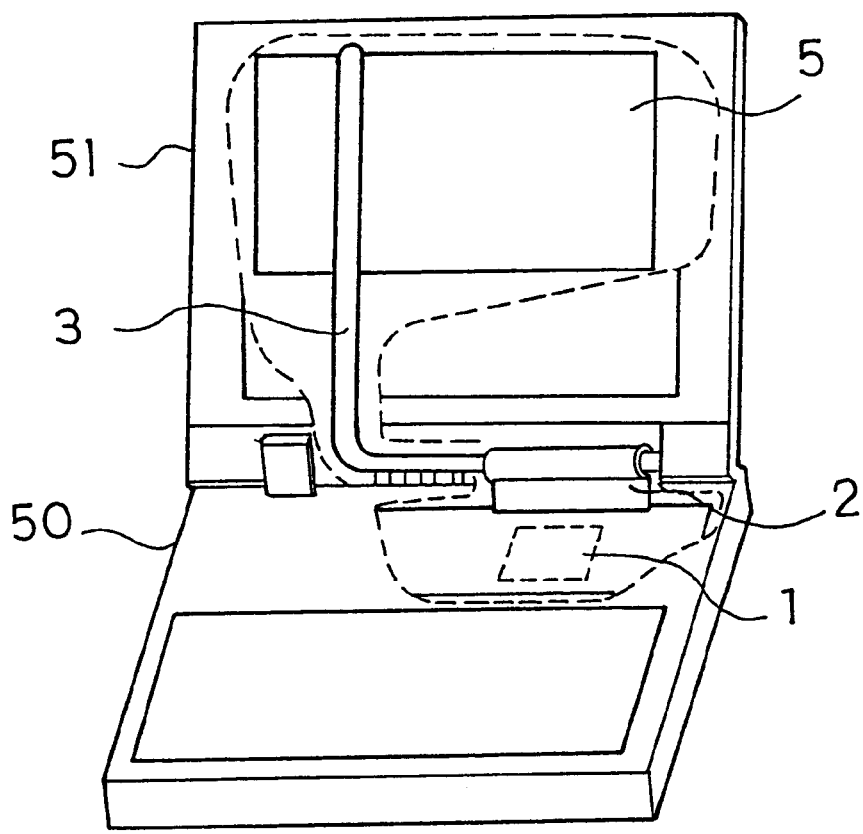
FIG. 47 illustrates a conventional heat spreading structure.
Figure 48:
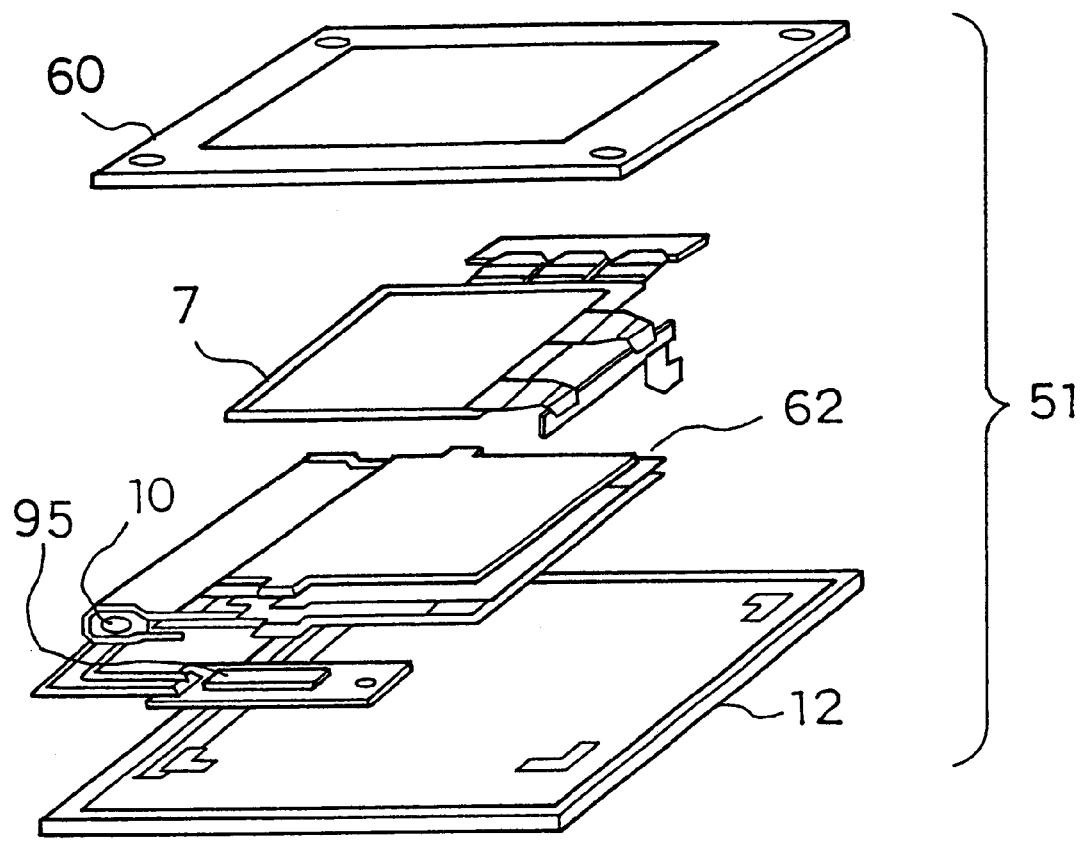
FIG. 48 is disintegrated side view of a lid.
Figure 49:
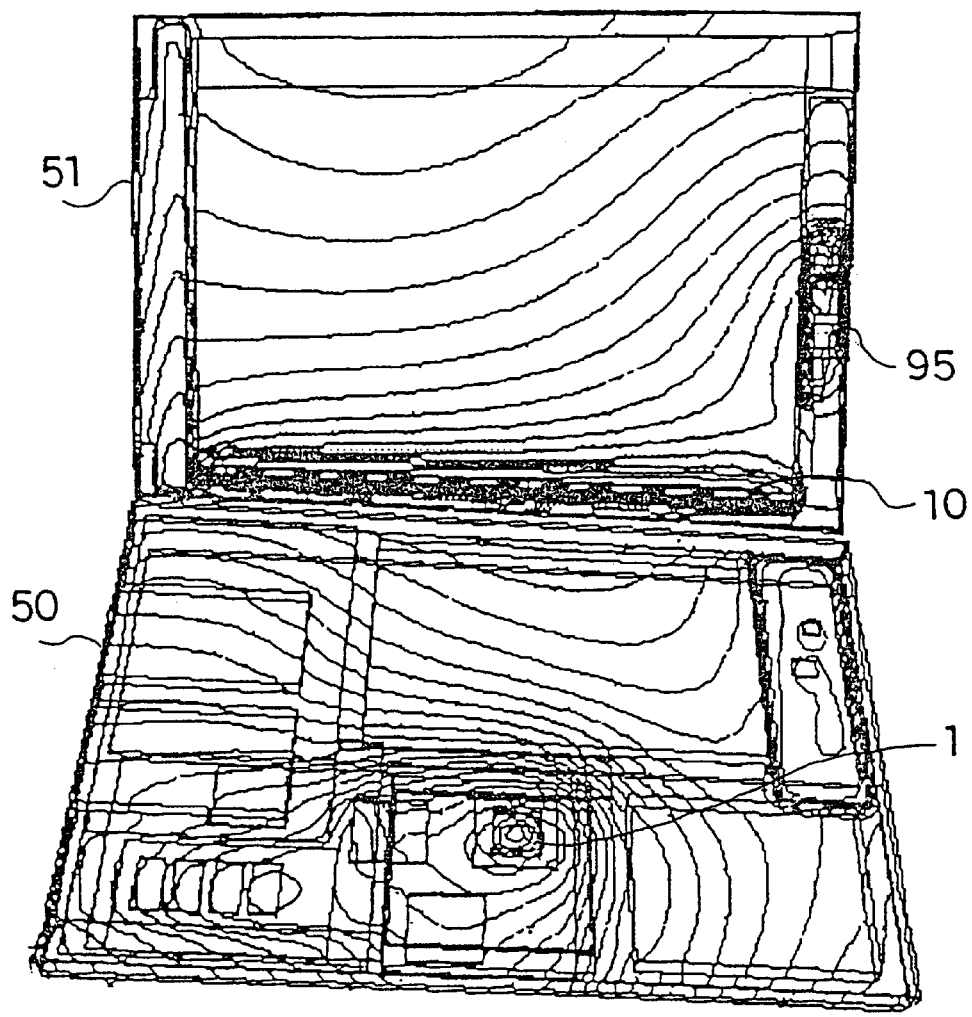
FIG. 49 is a temperature profile of the lid and the main body.

FIG. 46 illustrates a case of placing the liquid reservoir 55 immediately above the CPU 1. For the case illustrated in FIG. 46, a sealing component 69 is installed in between the hinge 13 and the thermo-siphon 6. The sealing component 69 seals the hinge 13 and the thermo-siphon 6 together so that the working fluid will not leak, at the same time it allows rotation of the thermo-siphon 6 against the hinge 13. Although not illustrated in the drawings, however, the liquid reservoir 55 and the thermally conductive block 2 can be formed as one. By doing so, the heat spreading efficiency will increase further.

Also, when forming the thermo-siphon 6 using the pipe 49, if there is no wick in the thermo-siphon 6, the diameter of the pipe 49 can be made smaller than the heat pipe that has the wick, in addition to this, there is an advantage of being able to form this thermo-siphon at a low cost. Also, comparing the thermo-siphon 6 formed using the pipe 49 with the thermo-siphon 6 formed using the roll bond panel, the channel length of the pipe 49 can be longer for the thermo-siphon 6 formed using the pipe 49, therefore, heat spreading function is expanded.

According to embodiment 3 of the present invention, since the one end of a circulation pipe is connected to the thermo-siphon and inside the circulation pipe the working fluid is circulating which is introduced by the thermo-siphon, therefore, the heat generated at the heat generating unit is conducted from the one end to the other end of the circulation pipe, and the heat is efficiently conducted to the thermo-siphon. Also, the working fluid accommodated inside the thermo-siphon is circulated in the plane direction of the heat spreading board, such that the temperature profile of various positions of the heat spreading board is equalized. As a result of this, the heat generated at the heat generation unit is dissipated throughout the plane of the heat spreading board, and the heat is effectively released to outside using the whole surface area of the heat spreading board.

According to embodiment 3 of the present invention, since a circulation pipe is divided into the vapor channel and the liquid flow back channel using a partition wall, therefore, the working fluid vaporized at the end of the circulation pipe will run through the vapor channel towards the thermo-siphon, and the liquefied working fluid at the thermo-siphon will run through the liquid flow back channel to return to the end of the circulation pipe. Accordingly, the vaporized working fluid and the liquefied working fluid will function without crashing with one another or without dispersing in all direction, and flows smoothly inside the circulation pipe such that the heat generated at the heat generating unit will efficiently be released to outside.

According to embodiment 3 of the present invention, since a circulation pipe has a dual pipe structure including the inner pipe and the outer pipe, the vaporized working fluid at the end of the circulation pipe runs through the inner pipe towards the thermo-siphon, and the liquefied working fluid at the thermo-siphon will run through the outer pipe and return to the circulation pipe. Accordingly, the vaporized working fluid and the liquefied working fluid flow smoothly inside the circulation pipe without any crashes in the middle, and the heat generated at the heat generation unit will effectively be released to outside.

According to embodiment 3 of the present invention, since a wall of the circulation pipe installs a plurality of grooves, therefore, the vaporized working fluid at the end of the circulation pipe will runs through a central area of the circulation pipe towards the thermo-siphon, and on one hand the liquefied working fluid in the thermo-siphon will run along the grooves and will return to the hinge inside the thermally conductive block. As such, the vaporized working fluid and the liquefied working fluid flow smoothly inside the circulation pipe without any crashing in the middle, such that the heat generated at the heat generating unit is effectively released to outside.

According to embodiment 3 of the present invention, since a looped thermo-siphon is formed by joining the both ends of the circulation pipe, and the heat generated at the heat generation unit is efficiently conducted to the thermo-siphon and the heat spreading board. Also, since the working fluid accommodated inside the thermo-siphon is circulated in the plane direction of the heat spreading board, therefore, the temperature profile of various positions of the heat spreading board is equalized. As a result of this, the heat generated at the heat generation unit is dissipated throughout whole plane of the heat spreading board, and the heat is effectively released to outside from the whole plane of the heat spreading board.

According to embodiment 3 of the present invention, since a circulation pipe is coiled along the connecting axis of the main body and the lid, therefore, when the lid opens and closes, a diameter of the coiled part only will deform and the circulation pipe will not bend. As a result of this, an endurance of the circulation pipe increases.

According to embodiment 3 of the present invention, since a thermo-siphon is provided with the vapor channel and the liquid flow back channel, the vaporized working fluid at a central part of the circulation pipe runs through the vapor channel and proceeds to a direction away from the connecting axis. Then the working fluid that ran through the vapor channel will run through a plurality of liquid circulating channels, and proceeds to a direction close to the connecting axis. For a normal use, the lid stands up by lowering the connecting axis such that the edge that is farthest apart from the connecting axis will be the top. Accordingly, the vaporized working fluid will advance upwards as a vapor where the temperature of the heat spreading board is low, and the vaporized working fluid condenses, releases heat and liquefies to fall down the channel due to the gravity. Also, since the vapor and the liquid circulating channels are branched such that the vapors are minutely dispersed, condensed and releases heat inside the heat spreading board. As a result of this, the working fluid will definitely arrives to the central part of the circulation pipe. Accordingly, by advancing through the plurality of the liquid circulation channels, the heat of the working fluid is dispersed throughout the whole plane of the heat spreading board, and is effectively released to outside from the whole plane of the heat spreading board.

According to embodiment 3 of the present invention, since a thermo-siphon is assembled onto the heat spreading board of the lid of the information processing apparatus, for the two-phase flow circulation, the wick structure is not required in the heat pipe since the effect of gravity is being adopted, and the heat spreading mechanism can be manufactured at a low cost. Also, a roll bond panel can be used to form thermo-siphon, therefore, various channel patterns are possible and the equalization of temperature will be effective. Accordingly, the heat spreading structure that effectively uses the whole plane of the lid as the heat spreading area is implemented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus, comprising:
   a main body including a heat generation unit and a thermally conductive block integrally formed with a hinge which is located immediately above the heat generating unit;
   a lid for covering the main body;
   a thermo-siphon installed in the lid, for releasing a heat generated by the heat generation unit; and
   a circulation pipe connected to the thermo-siphon and the hinge, the circulation pipe for introducing a working fluid accommodated in the thermo-siphon, and for heating the working fluid via the hinge by the heat generated from the heat generating unit;

wherein the main body and the lid includes a connecting axis, and wherein the circulation pipe is coiled along the connecting axis of the main body and the lid.

2. The information processing apparatus according to claim 1, wherein one end of the circulation pipe is joined to the thermo-siphon and an other end is joined to the heat generating unit.

3. The information processing apparatus according to claim 2, wherein the circulation pipe includes a partition wall which divides into a vapor channel for sending the working fluid vaporized by the heat from the heat generating unit to the thermo-siphon and a liquid flow back channel for returning the working fluid liquefied at the thermo-siphon.

4. The information processing apparatus according to claim 2, wherein the circulation pipe includes an inner pipe for sending the working fluid vaporized by the heat from the heat generating unit to the thermo-siphon, and an outer pipe for returning the working fluid liquefied at the thermo-siphon.

5. The information processing apparatus according to claim 2, wherein the circulation pipe installs a plurality of grooves at an inner wall of the circulation pipe.

6. The information processing apparatus according to claim 2, wherein the circulation pipe installs a wick at an inner wall of the circulation pipe.

7. The information processing apparatus according to claim 1, wherein one end and the other end of the circulation pipe is joined to the thermo-siphon, passing the heat generating unit in the middle for introducing the working fluid of the thermo-siphon from the one end and circulate the working fluid to the other end.

8. The information processing apparatus according to claim 7, wherein the main body and the lid include a connecting axis, and wherein the thermo-siphon includes a vapor channel which extends in a direction farthest from the connecting axis of the main body and the lid, and which joins to the other end of the circulation pipe and, and a plurality of liquid flow back channels which extends in a direction close to the connecting axis, which branches from the vapor channel, and which joins to the one end of the circulation pipe.

* * * * *